(12) United States Patent
Shah et al.

(10) Patent No.: US 10,892,585 B2
(45) Date of Patent: Jan. 12, 2021

(54) INTERCONNECT MODULE FOR BOTH PANEL AND MID BOARD MOUNTING

(71) Applicant: SAMTEC INC., New Albany, IN (US)

(72) Inventors: Jignesh Shah, New Albany, IN (US); Jean Karlo Williams Barnett, New Albany, IN (US); Eric Zbinden, Santa Clara, CA (US)

(73) Assignee: SAMTEC, INC., New Albany, IN (US)

( * ) Notice: Subject to any disclaimer, the term of this patent is extended or adjusted under 35 U.S.C. 154(b) by 0 days.

(21) Appl. No.: 16/345,316

(22) PCT Filed: Oct. 26, 2017

(86) PCT No.: PCT/US2017/058493
§ 371 (c)(1),
(2) Date: Apr. 26, 2019

(87) PCT Pub. No.: WO2018/081398
PCT Pub. Date: May 3, 2018

(65) Prior Publication Data
US 2019/0305482 A1    Oct. 3, 2019

Related U.S. Application Data

(60) Provisional application No. 62/413,377, filed on Oct. 26, 2016.

(51) Int. Cl.
*H01R 13/631*       (2006.01)
*H01R 13/627*       (2006.01)
(Continued)

(52) U.S. Cl.
CPC ......... *H01R 13/631* (2013.01); *G02B 6/4261* (2013.01); *G02B 6/4284* (2013.01);
(Continued)

(58) Field of Classification Search
CPC .......................... H01R 13/631; H01R 12/718; H01R 13/6271; G02B 6/4261; G02B 6/4284; G02B 6/4269
See application file for complete search history.

(56) References Cited

U.S. PATENT DOCUMENTS 5,476,390 A * 12/1995 Taguchi ........... H01R 13/62938
439/155
7,040,917 B2 * 5/2006 Yagi ..................... H01R 9/0527
439/495

(Continued)

FOREIGN PATENT DOCUMENTS

CN         1681218 A      10/2005
CN       102484342 A       5/2012
(Continued)

*Primary Examiner* — Jean F Duverne
(74) *Attorney, Agent, or Firm* — BakerHostetler

(57) ABSTRACT

An interconnect module, such as a transceiver is configured to mate with a host module that includes first and second electrical connectors. The interconnect module includes first and second pluralities of lands that are spaced from each other. The interconnect module can be mated with the host module such that the first lands mate with the first electrical connector, and the second lands mate with the second electrical connector. As the interconnect module is mated with the host module, the first lands can pass over mating regions of the electrical contacts of the second electrical connector without wiping against the mating regions. The interconnect module can be used in both front panel mount and mid board mount applications.

20 Claims, 14 Drawing Sheets

(51) Int. Cl.
 *G02B 6/42* (2006.01)
 *H01R 12/71* (2011.01)
(52) U.S. Cl.
 CPC ....... *H01R 12/718* (2013.01); *H01R 13/6271*
  (2013.01); *G02B 6/4269* (2013.01)

(56) References Cited

U.S. PATENT DOCUMENTS

| | | |
|---|---|---|
| 7,329,054 B1 | 2/2008 | Epitaux et al. |
| 7,648,287 B2 | 1/2010 | Epitaux et al. |
| 7,766,559 B2 | 8/2010 | Epitaux et al. |
| 7,824,112 B2 | 11/2010 | Epitaux et al. |
| 8,419,453 B2 | 4/2013 | Chiang |
| 9,374,165 B2 | 6/2016 | Zbinden et al. |
| 2008/0222351 A1 | 9/2008 | Verdiell et al. |
| 2009/0163067 A1* | 6/2009 | Niitsu .................. H01R 12/79 439/329 |
| 2011/0123150 A1 | 5/2011 | Zbinden et al. |
| 2011/0123151 A1 | 5/2011 | Zbinden et al. |
| 2013/0072045 A1 | 3/2013 | Chiang |
| 2015/0378116 A1 | 12/2015 | Zbinden et al. |

FOREIGN PATENT DOCUMENTS

| | | |
|---|---|---|
| CN | 102498620 A | 6/2012 |
| CN | 103124032 A | 5/2013 |
| CN | 103168396 A | 6/2013 |
| JP | 2000-150065 A | 5/2000 |
| JP | 2006-126340 A | 5/2006 |
| JP | 2001-307823 A | 11/2019 |

\* cited by examiner

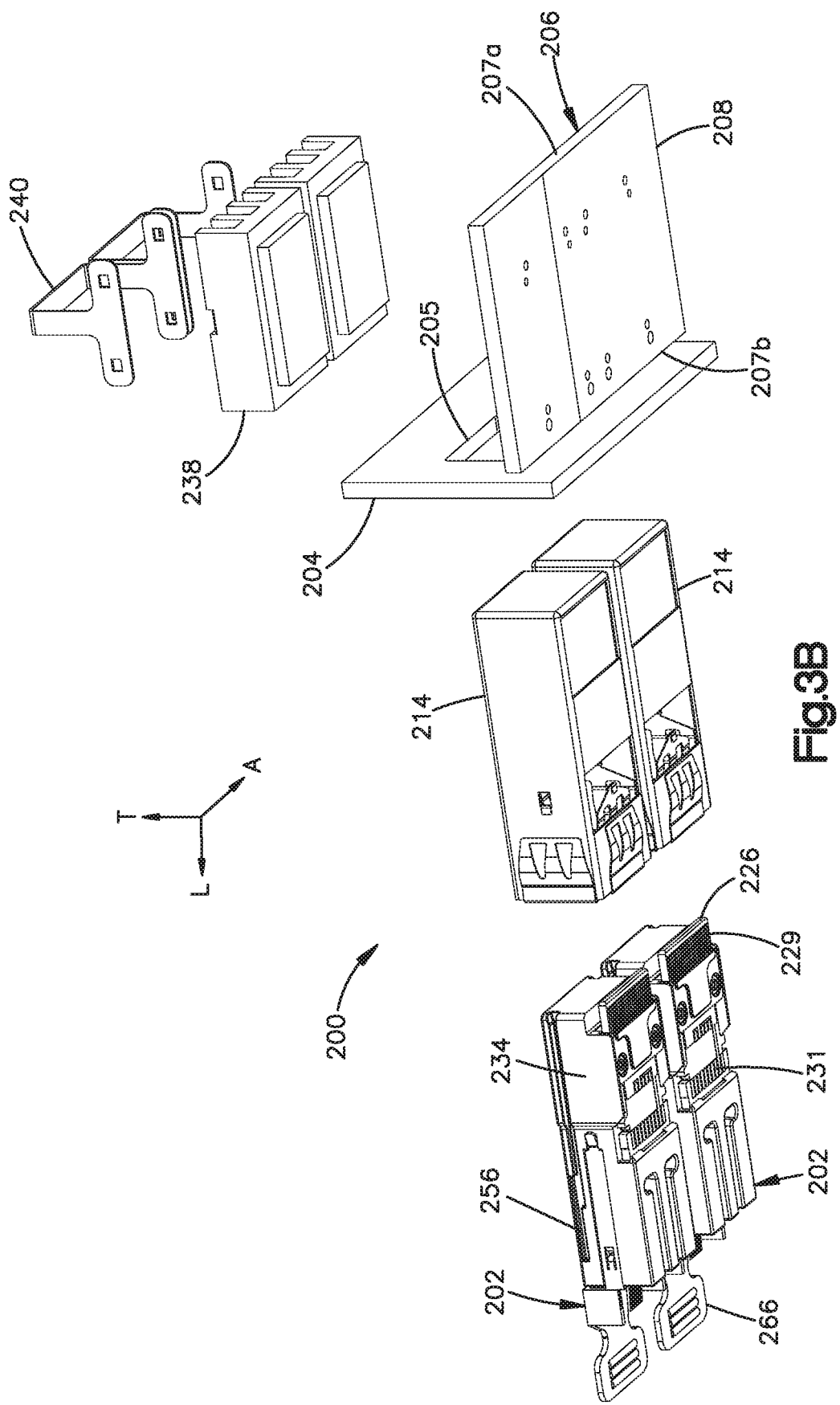

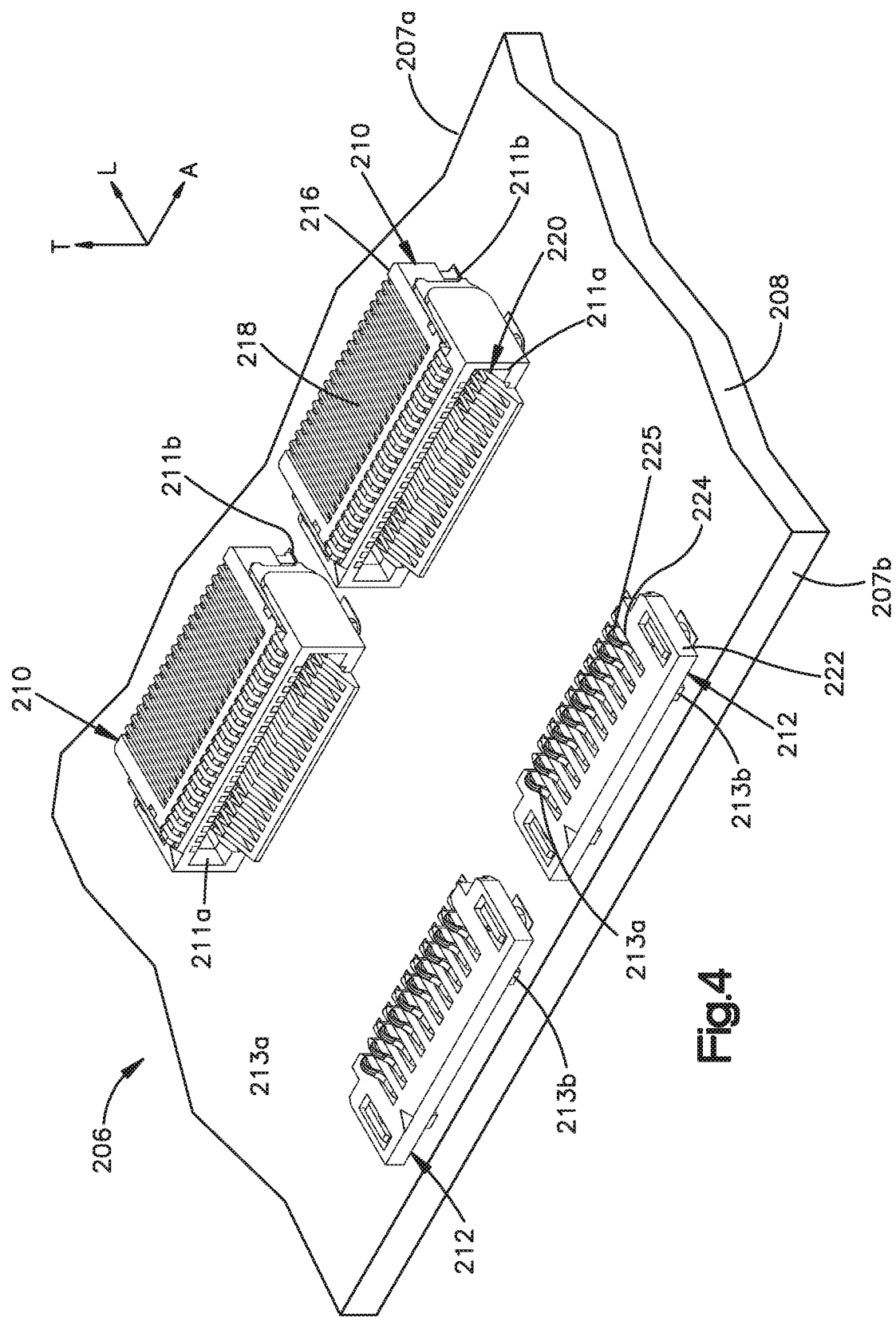

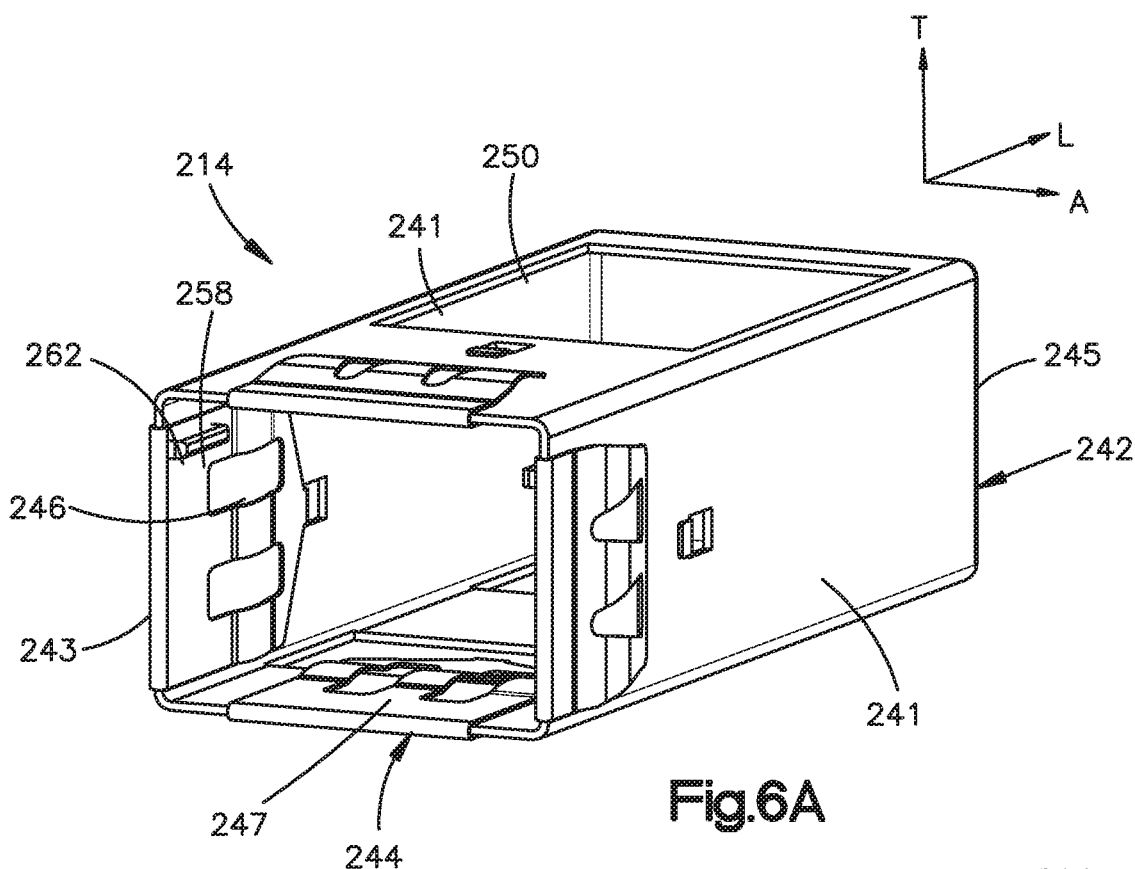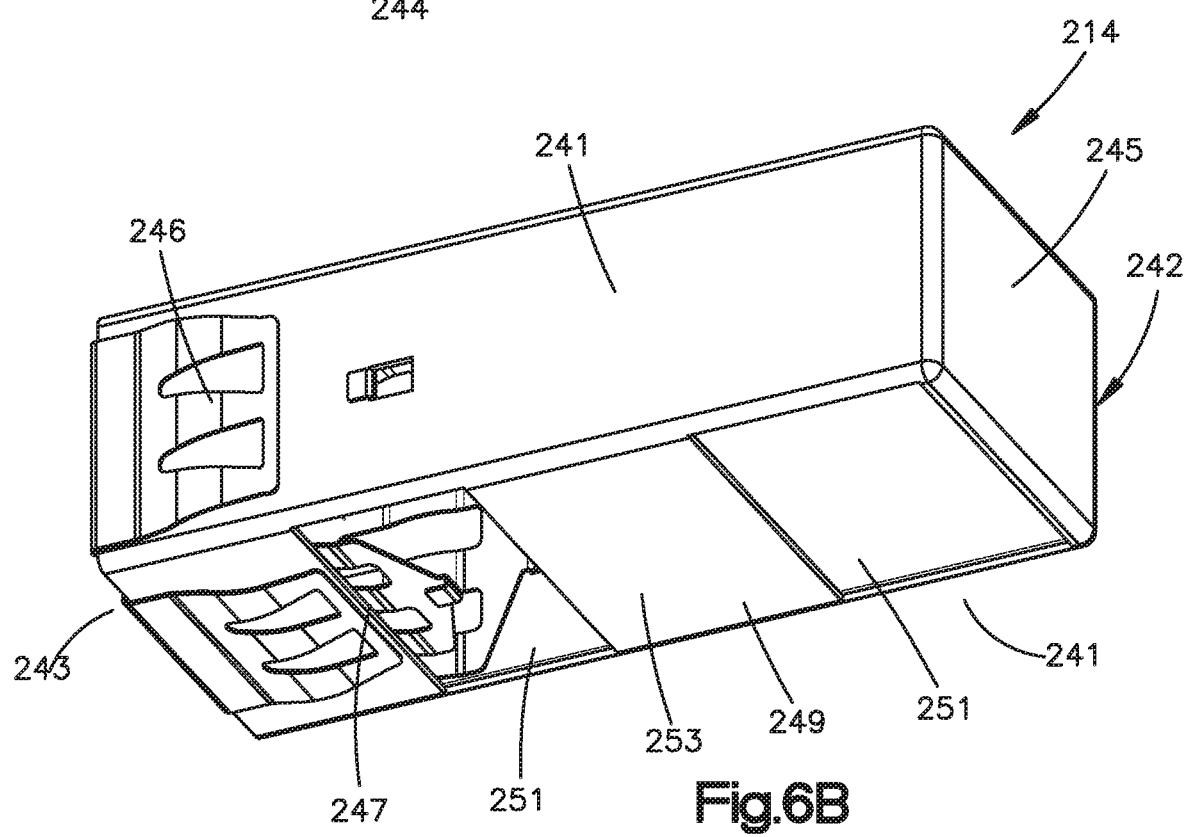

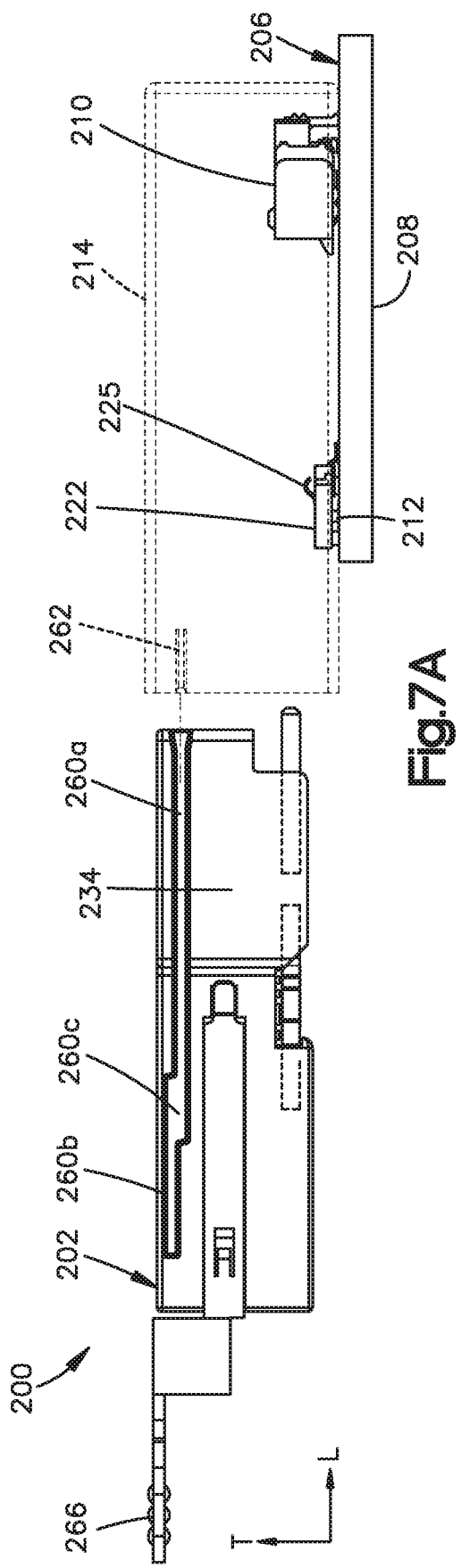
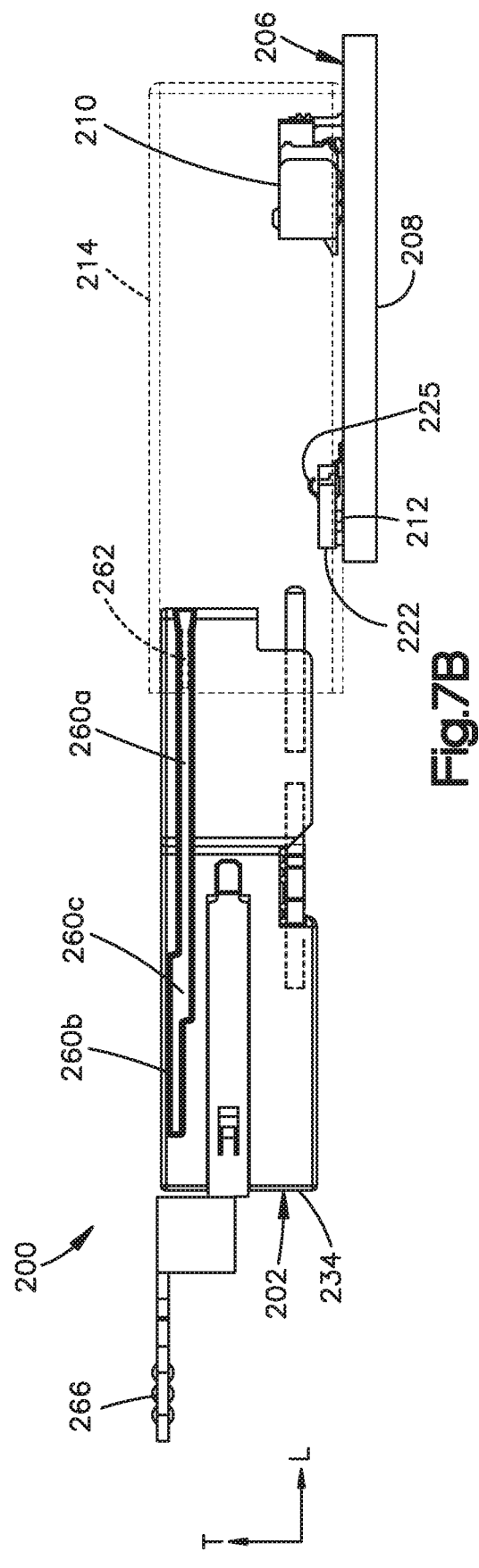
Fig.7A
Fig.7B

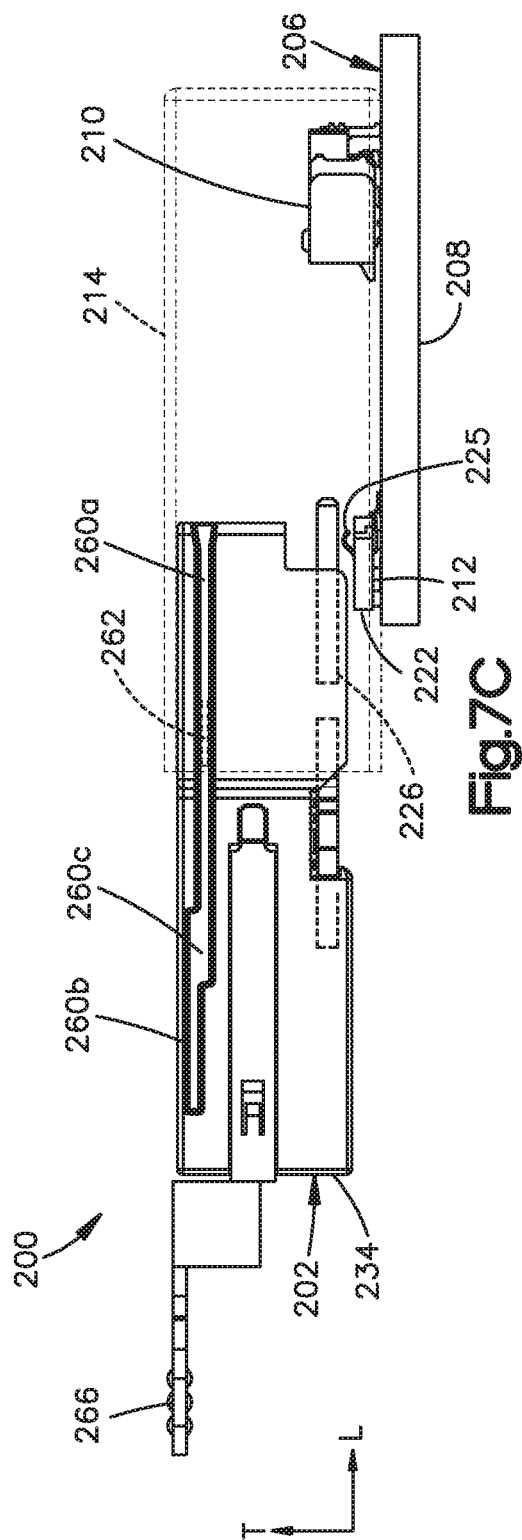
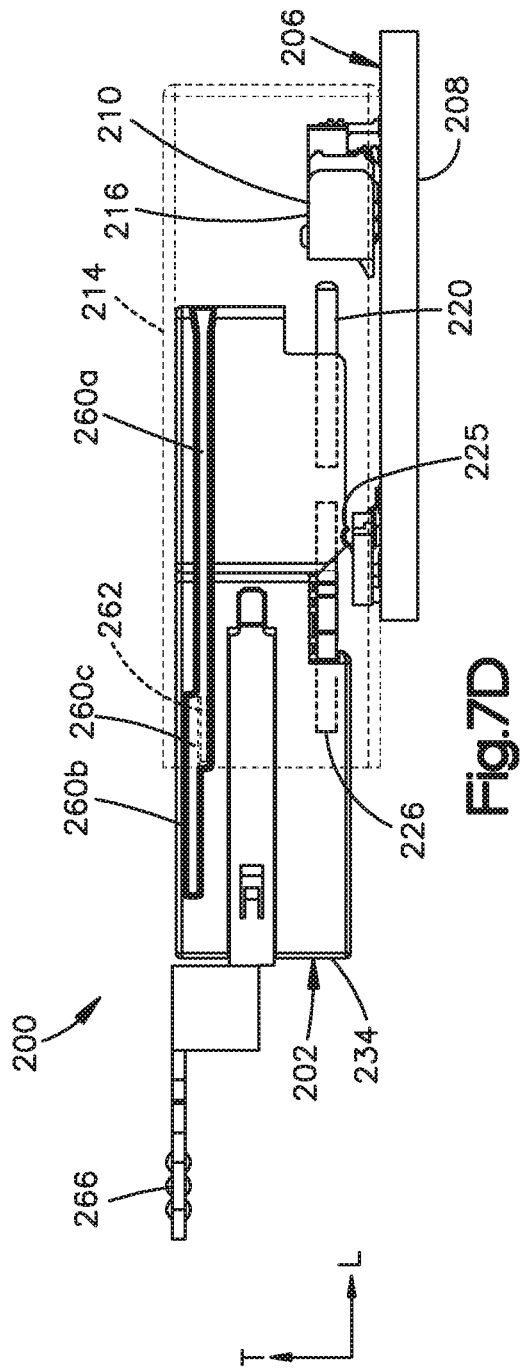

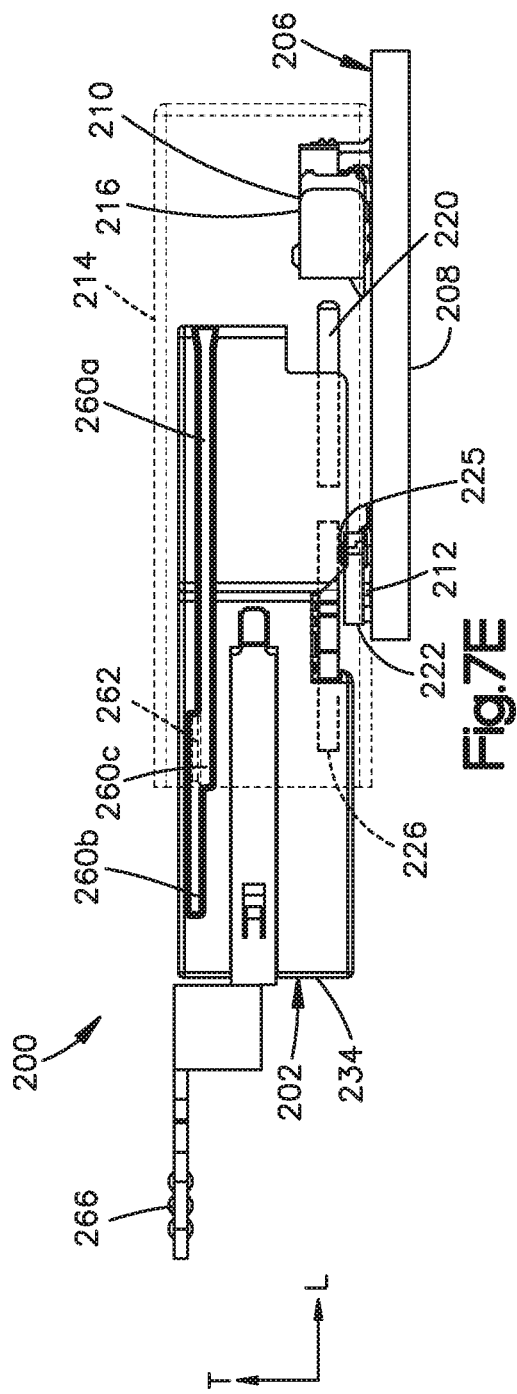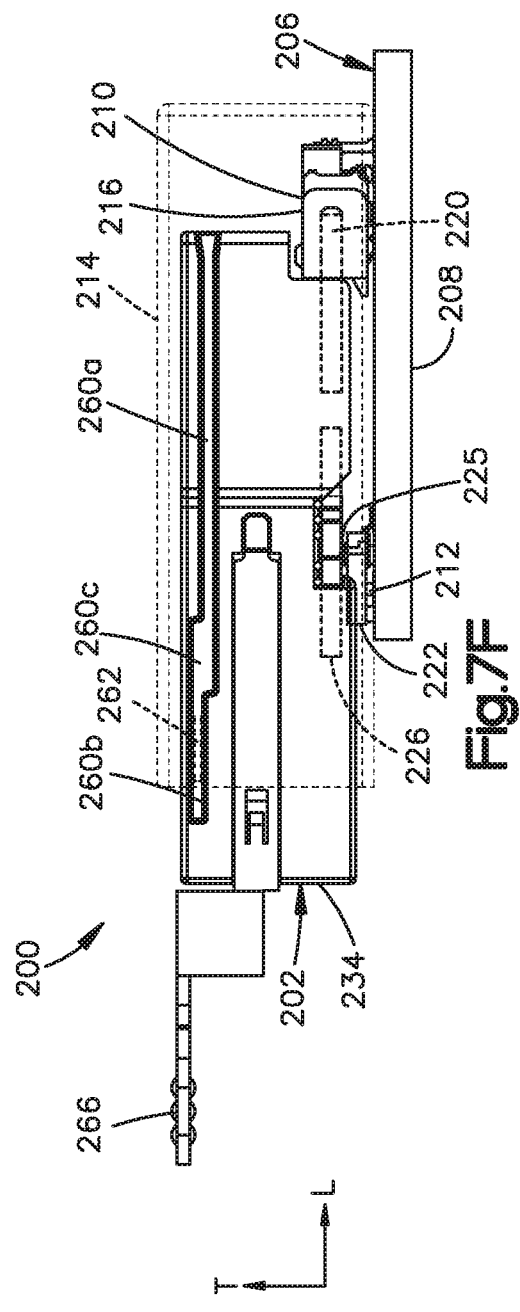

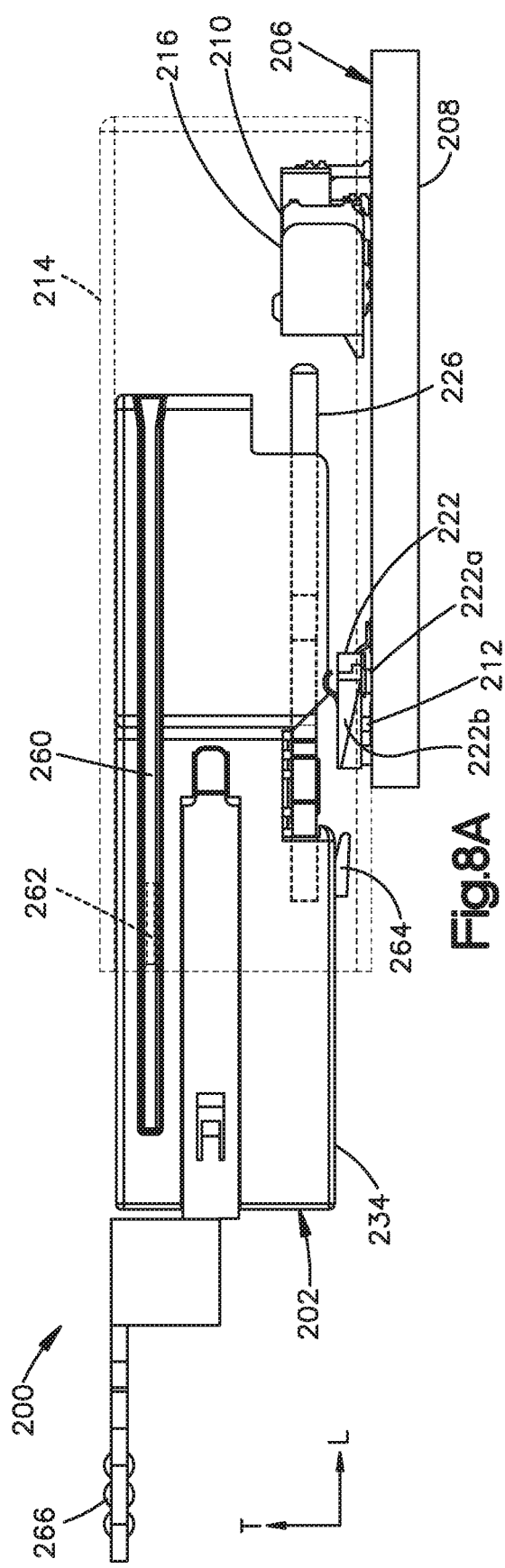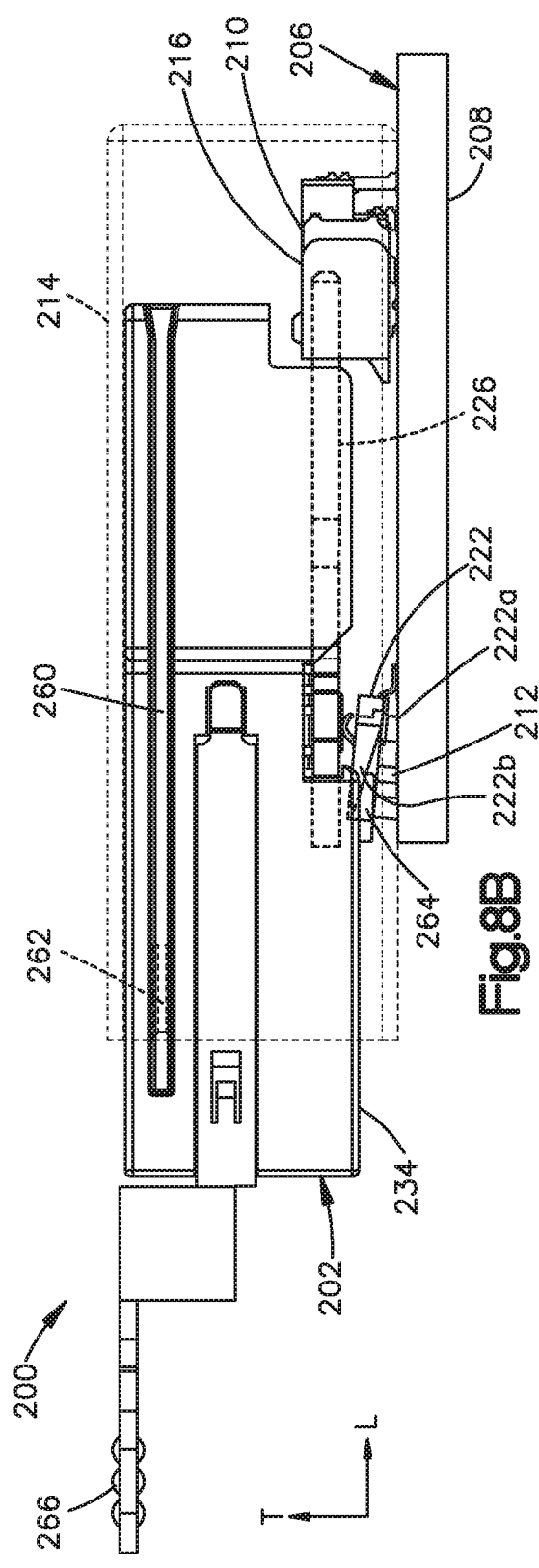

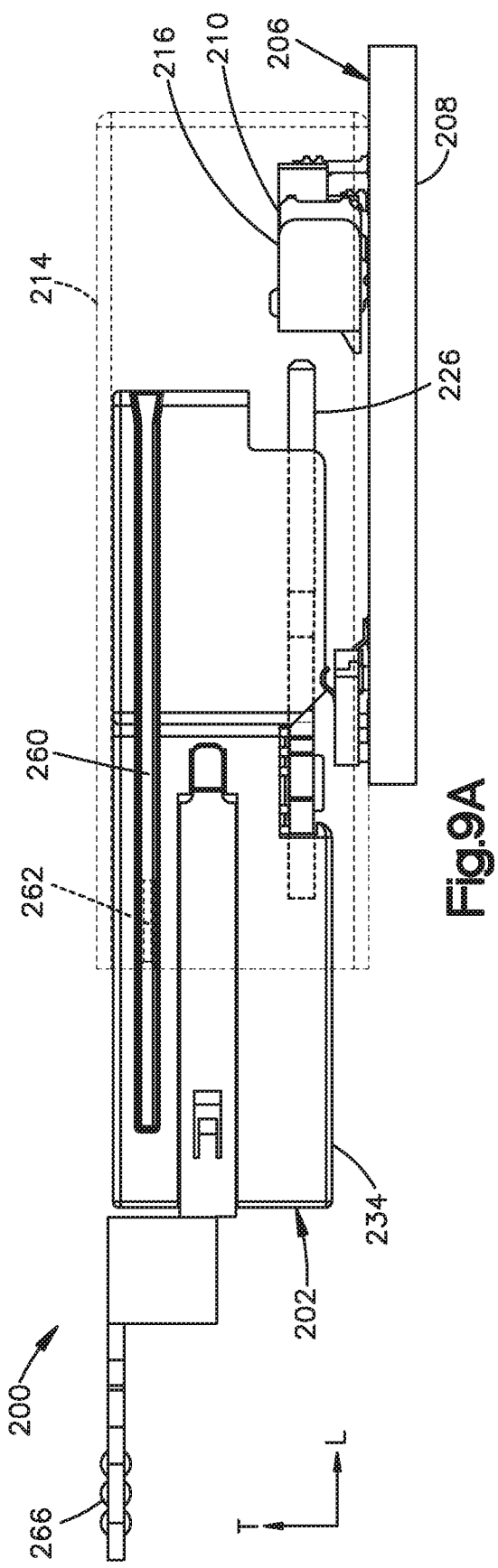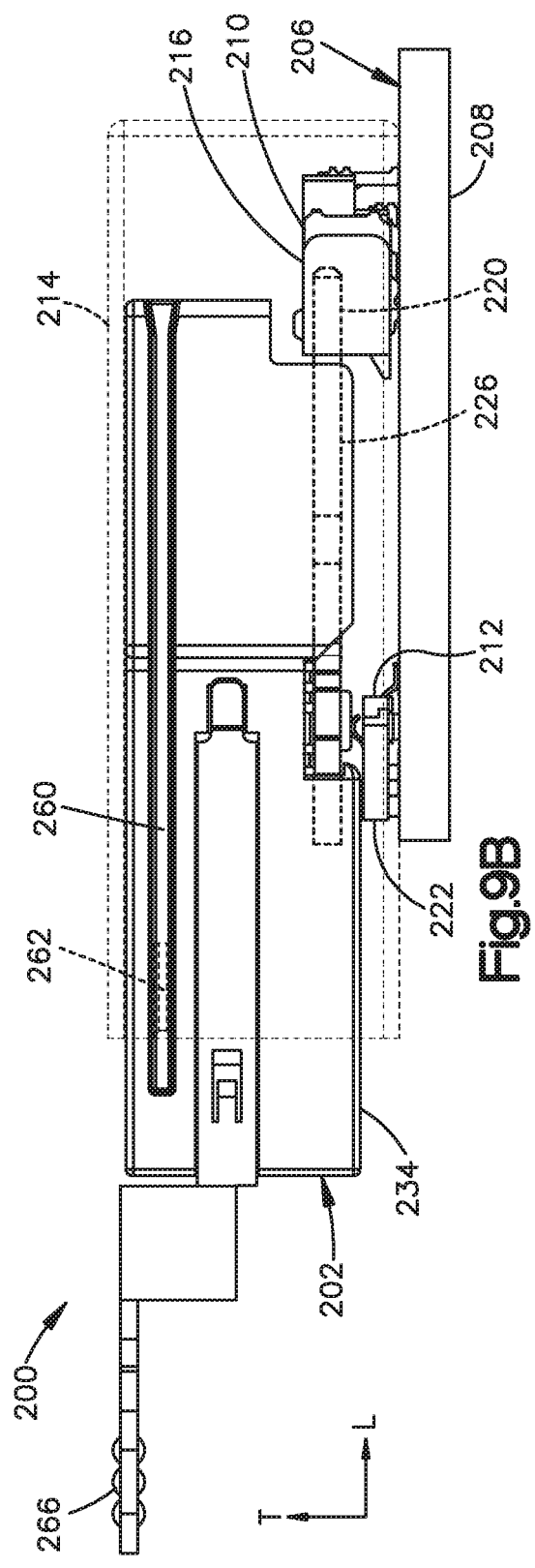

INTERCONNECT MODULE FOR BOTH PANEL AND MID BOARD MOUNTING

CROSS-REFERENCE TO RELATED APPLICATIONS

This application is the National Stage Application of International Patent Application No. PCT/US2017/058943, filed Oct. 26, 2017, which claims priority to U.S. Patent Application Ser. No. 62/413,377 filed Oct. 26, 2016, the disclosure of which is hereby incorporated by reference as if set forth in its entirety herein.

BACKGROUND

The explosive growth of the Internet has fueled demand for higher bandwidth and connectivity in the systems and components that support high bandwidth data transmission and switching. The servers and switches that enable Internet communication are often configured in electronic racks connected by front panel mounted cables, which connect the individual servers and switches together. As the connectivity and bandwidth requirements have increased mid board or on-board interconnection systems have been developed. These systems overcome some of the bandwidth and physical constraints of front panel mounted systems. Recently, an effort has been made to standardize the mid board interconnect solutions by the Consortium for On-Board Optics (COBO) standards committee. This committee is developing a multi-source agreement to standardize mid board interconnect solutions.

U.S. Pat. No. 9,374,165 describes a plurality of interconnect systems, and describes with respect to FIGS. 15A-16B of U.S. Pat. No. 9,374,165 an example of one of several embodiments of a transceiver that can include an optical engine, and a cable connected to the optical engine. U.S. Pat. No. 9,374,165 is hereby incorporated by reference as if set forth in its entirety herein. Examples of optical engines are disclosed in U.S. Pat. Nos. 7,329,054, 7,648,287, 7,766,559, 7,824,112, U.S. Patent Application Publication No. 2008/0222351, U.S. Patent Application Publication No. 2011/0123150, and U.S. Patent Application Publication No. 2011/0123151, the entirety of each of which is hereby incorporated by reference as if set forth in its entirety herein. Some of the embodiments described in the above references are compatible with the developing COBO standards.

As described in U.S. Pat. No. 9,374,165, and also as illustrated at FIGS. 1A-1C, the cable 116 can include one or more fiber optic cables alone or in combination with one or more copper cables. The transceiver 115 can include a interconnect substrate 113 and an optical engine that can be mounted onto the interconnect substrate 113. The interconnect substrate 113 can be configured as a first printed circuit board. The optical engine is configured to receive optical signals from the cable 116, and convert the optical signals to electrical signals. Further, the optical engine is configured to receive electrical signals, convert the electrical signals to optical signals, and transmit the optical signals along the cables. The interconnect substrate 113 can include an IC chip 115f (FIG. 6C of U.S. Pat. No. 9,374,165) that is configured to route and/or modify the electrical signals transmitted to and from the transceiver, including conditioning the electrical signals for protocol specific data transfers.

The interconnect system further includes a first electrical connector 152 and a second electrical connector 154 that are mounted onto a host substrate 118, such as a second printed circuit board. The interconnect module 102 is configured to mate with both the first electrical connector 152 and the second electrical connector 154. In particular, the first electrical connector 152 can include an electrically insulative first connector housing 148 and a plurality of first electrical contacts 150 supported by the first connector housing 148. The second electrical connector 154 can include an electrically insulative second connector housing 153 and a plurality of second electrical contacts 155 supported by the second connector housing 153. The second electrical contacts 155 can be configured as compression contacts that define respective mating regions 157. Thus, the interconnect substrate 113 can be brought down onto the mating regions 157 so as to compress against the second electrical contacts 155 and mate the interconnect module 102 with the second electrical connector 154. Thus, the second electrical connector 154 can be referred to as an electrical compression connector. In one example, the interconnect substrate can be inserted into the first electrical connector 152 at an angle relative to the host substrate 118, and then the interconnect module 102 can be brought down against the first electrical connector 152. Alternatively, the interconnect substrate 113 can be translated along a direction parallel to the host substrate 118 while oriented parallel to the host substrate 118 in order to mate to each of the first and second electrical connectors 152 and 154.

During operation, optical signals received by the interconnect module 102 from the cable 116 are converted to electrical signals. Ones of the electrical signals are routed to the first electrical connector 152, while others of the electrical signals are routed to the second electrical connector 154. For instance, high speed electrical signals can be routed to the first electrical connector, and low speed electrical signals can be routed to the second electrical connector. For instance, the first electrical connector can be configured to transmit electrical signals at data transfer speeds of at least 10 Gigabits per second. Electrical power can also be routed to the second electrical connector. Conversely, electrical signals received by the interconnect module 102 from the first and second electrical connectors 152 and 154 are converted into optical signals and output along the optical cables of the cable 116. Thus, the interconnect module 102 can be configured as a transceiver. Of course, in embodiments whereby the cable includes electrically conductive cables, the interconnect module 102 is configured to receive electrical signals from the electrically conductive cables, and transmit electrical signals to the cable 116. Various ones of the electrical signals are routed to the first electrical connector, and various others of the electrical signals are routed to the second electrical connector. Of course, if the cable 116 includes only electrical cables, the transceiver could be provided without the optical engine.

The first electrical connector 152 can be mounted to the host substrate 118 at a location spaced in a forward direction from a location where the second electrical connector 154 is mounted to the host substrate 118. Similarly, the second electrical connector 154 is spaced from the first electrical connector 152 in a rearward direction opposite the forward direction. Thus, the first electrical connector 152 can be referred to as a front electrical connector, and the second electrical connector 154 can be referred to as a rear electrical connector. In one example, the transceiver substrate 113 is mated to the first electrical connector 152 in the forward direction, thereby establishing an electrical connection between electrical contacts of the first electrical connector and electrically conductive lands of the transceiver substrate 113. The first electrical connector 152 can be configured as a right-angle electrical connector. Next, the transceiver substrate 113 can be mated with the second electrical connector 154 by bringing electrically conductive lands on the bottom side of the transceiver substrate 113 onto vertical compression electrical contacts of the second electrical connector 154, which can be configured as a compression connector.

SUMMARY

In accordance with one aspect of the present disclosure, an interconnect module can be configured to mate with a host module having a host substrate and first and second pluralities of electrical contacts supported by the host module. The interconnect module can include an interconnect substrate that defines atop and bottom surfaces opposite each other along a transverse direction, and front and rear ends opposite each other along a longitudinal direction that is oriented substantially perpendicular to the transverse direction. The interconnect module can further include a plurality of first electrical lands carried by the bottom surface. The interconnect module can further include a plurality of second electrical lands carried by the bottom surface disposed such that the first electrical lands are spaced from the second electrical lands in a forward direction that is oriented along the longitudinal direction. The interconnect module can further include a first guide member configured to engage a second guide member of a panel so as to guide the interconnect module to mate with a host module in the forward direction such that 1) the first lands pass by the second electrical contacts while spaced from the second electrical contacts along the transverse direction, 2) the first lands mate with the first electrical contacts, and 3) the second lands mate with the second electrical contacts.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3B is another exploded perspective view of the interconnect system illustrated in FIG. 3A;

FIG. 4 is a perspective view of the host module illustrated in FIG. 2;

FIG. 6A is a perspective view of the cage illustrated in FIG. 2;

FIG. 6B is a perspective view of the cage illustrated in FIG. 6A;

FIGS. 7A-7F are side elevation views of the interconnect system showing the interconnect module being mated to the host module;

FIG. 8A is a side elevation view of the interconnect system constructed in accordance with an alternative embodiment showing the interconnect module aligned to be mated with the host module;

FIG. 8B is a side elevation view of the interconnect system illustrated in FIG. 8A showing the interconnect module mated with the host module;

FIG. 9A is a side elevation view of the interconnect system constructed in accordance with an alternative embodiment showing the interconnect module aligned to be mated with the host module;

FIG. 9B is a side elevation view of the interconnect system illustrated in FIG. 9A showing the interconnect module mated with the host module;

DETAILED DESCRIPTION

The present disclosure recognizes that it can be desirable to mate an interconnect module through a panel to a host module that includes first and second electrical connectors. The host module can further include a host substrate to which the first and second electrical connectors are mounted. The host substrate can be maintained in a fixed position relative to the panel. In one example of the present disclosure, an interconnect system can include a guidance system that causes the electrical lands of the interconnect module that mate with the first electrical connector to travel past the second electrical connector without wiping against the electrical contacts of the second electrical connector.

The present disclosure further recognizes that it may be desirable to mate the interconnect module to a host module at a mid board location of the host substrate (i.e. inwardly spaced from an outer perimeter of the host substrate). It would be advantageous to have an interconnection system compatible with both panel and mid board mounting. Thus, the interconnect module can be configured to selectively form electrical connections to a host substrate either along the edge of the substrate through a panel or at a mid board location of the host substrate.

Figure 2:
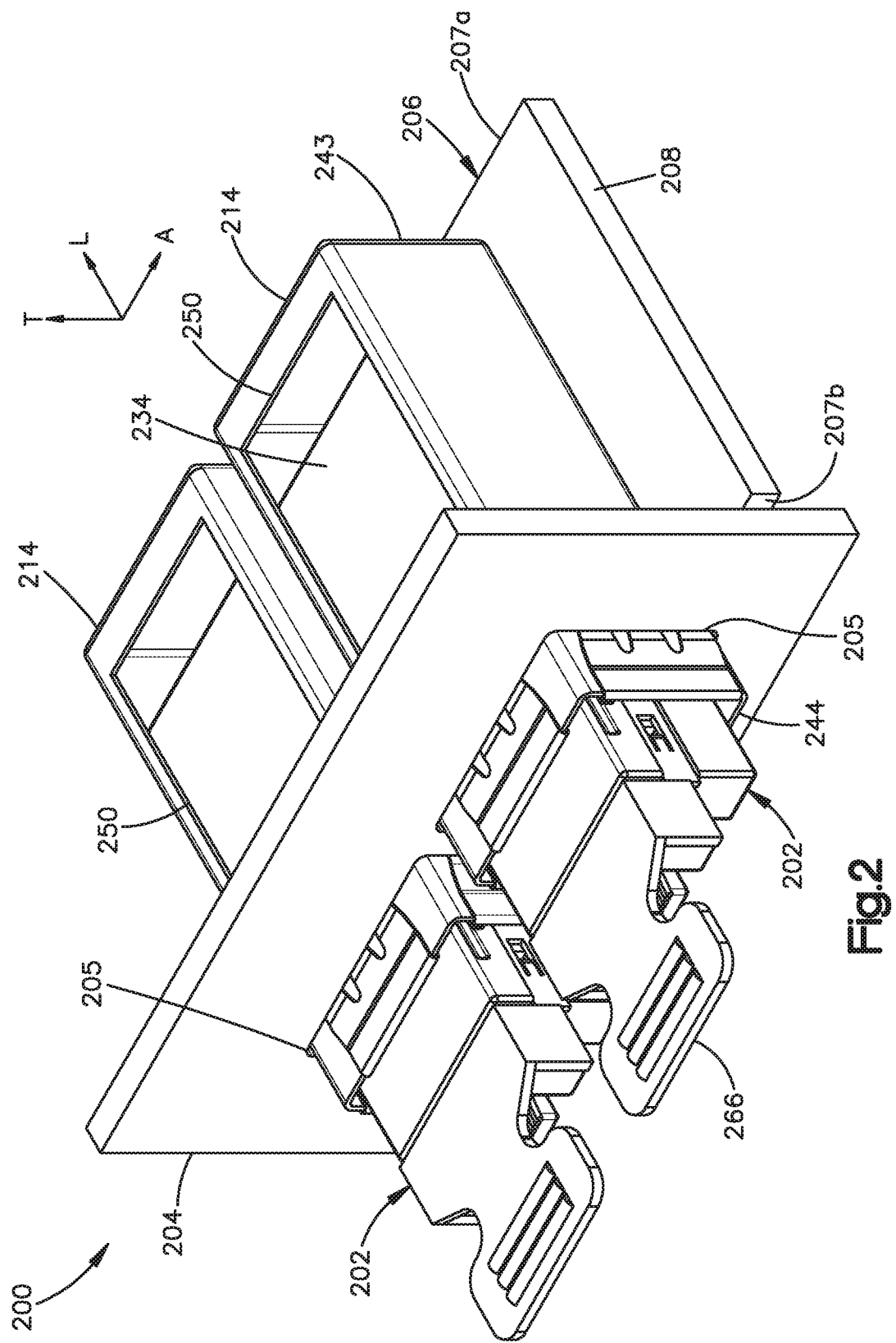
FIG. 2 is a perspective view of an interconnect system including host module, and an interconnect module mated with the host module through a panel in a cage.

Referring initially to FIGS. 2-3B, an interconnect system 200 can include at least one interconnect module 202, at least one panel 204, and at least one host module 206. The interconnect module 202 is configured to be mounted through the panel 204 (for instance through a cage) and mated to the host module 206. In particular, the host module 206 includes a host substrate 208, at least one electrical connector mounted to the host substrate 208. The host substrate 208 can be retained at a fixed location with respect to the panel 204. In this regard, the host substrate 208 can be referred to as a panel-mount host substrate 208. In one example, the host substrate 208 can be attached to the panel 204. Alternatively, the host substrate 208 can be supported relative to the panel 204 by any suitable alternative structure as desired.

The host module 206 can include at least one first electrical connector 210 mounted to the host substrate 208, and at least one second electrical connector 212 mounted to the host substrate 208. Alternatively, the first and second electrical connectors 210 and 212 can be mounted to respective first and second host substrates that are separate from each other. The first and second host substrates can be in electrical communication with each other or electrically isolated from each other as desired. The first electrical connector 210 can be configured to transmit data at higher speeds than the second electrical connector 212. The second electrical connector 212 can be further configured to transmit electrical power. The interconnect module 202 is configured to be mounted to the panel 204 and mated to each of the first and second electrical connectors 210 and 212 of the host module 206. As will be appreciated from the description below, interconnect system 200 can be configured to guide the interconnect module 202 within the host module 206 as the interconnect module 202 is mounted to the panel 204. In particular, the interconnect system 200 can further include a cage 214 that is configured to be mounted to the host substrate 208, and also extend through the panel 204. The interconnect module 202 is configured to be inserted into the cage 214 so as to mount to the panel 204. As the interconnect module 202 is mounted to the panel 204, it is guided by the cage 214 into a mated position with the first and second electrical connectors 210 and 212 of the host module 206.

Referring to FIG. 4 in particular, and as described above, the host module 206 can include the host substrate 208 and at least one electrical connector that is mounted to the host substrate 208. The host substrate 208 can be configured as a printed circuit board. In one example, the at least one electrical connector can include at least one first electrical connector 210 and at least one second electrical connector 212 that are each mounted onto the host substrate 208. The first and second electrical connectors 210 and 212 can be spaced from each other along a longitudinal direction L. The first and second electrical connectors 210 and 212 can further be at least partially aligned with each other along the longitudinal direction L. Thus, a straight line oriented along the longitudinal direction can pass through each of the first electrical connector 210 and the second electrical connector 212. The first electrical connector 210 can be spaced from the second electrical connector 212 in a forward direction. Conversely, the second electrical connector 212 can be spaced from the first electrical connector 210 in a rearward direction that is opposite the forward direction. The forward direction and the rearward direction can each be oriented along the longitudinal direction L.

The host substrate 208 can define a first end 207a and a second end 207b that is opposite the first end 207a along the longitudinal direction L. In particular, the first end 207a can be spaced from the second end 207b in the forward direction. Similarly, the second end 207b can be said to be spaced from the first end 207a in the rearward direction. Thus, the first end 207a can be referred to as a front end, and the second end 207b can be referred to as a rear end. The forward and rearward directions can each be oriented along the longitudinal direction L. The first electrical connector 210 can be mounted to the host substrate 208 adjacent the first end 207a, and the second electrical connector 212 can be mounted to the host substrate 208 adjacent the second end 207b. The second electrical connector 212 can be spaced from the second edge 207b a respective distance along the longitudinal direction L that is less than the distance that the first and second electrical connectors 210 and 212 are spaced from each other along the longitudinal direction L. During operation, second edge 207b of the host substrate 208 can face the panel 204. For instance, in certain examples the second edge 207b of the host substrate 208 can abut the panel 204.

The first electrical connector 210 includes an electrically insulative first connector housing 216 and a first plurality of electrical contacts 218 that are supported by the first connector housing 216. For instance, mating regions of the first plurality of electrical contacts 218 can be arranged in at least one row that is oriented along a lateral direction A. The lateral direction A can be oriented substantially perpendicular to the longitudinal direction L. In one example, the mating regions of the electrical contacts 218 can be arranged in top and bottom rows of first electrical contacts 218 that are spaced from each other along a transverse direction T that is oriented substantially perpendicular to the each of the longitudinal direction L and the lateral direction A. The term "substantially" as used herein with respect to directional terms recognizes that the directions may be offset due to, for instance, manufacturing tolerances. The top row of the mating regions of the first electrical contacts 218 can be spaced from the bottom row of the mating regions of the first electrical contacts 218 in an upward direction T that is oriented along the transverse direction. The upward direction can extend away from the host substrate 208. Thus, the bottom row of the mating regions of the first electrical contacts 218 can be disposed between the top row of the mating regions of the first electrical contacts 218 and the host substrate 208.

Figure 1A:
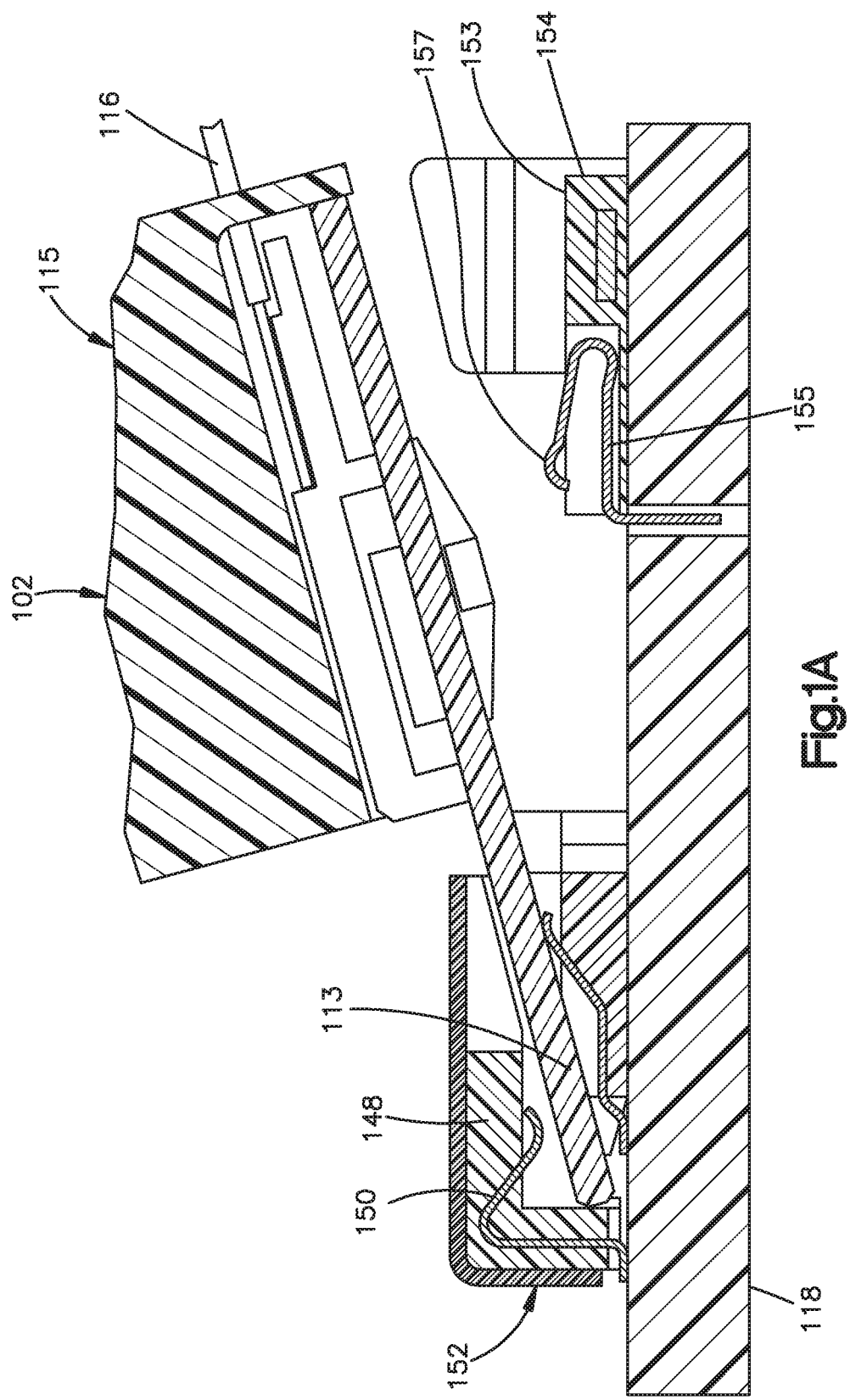
FIG. 1A is a side elevation view of a conventional interconnect system including an interconnect module shown mated to a host module.

The first electrical connector 210 can be configured as described above with respect to the first electrical connector 152 illustrated in FIG. 1A. Thus, the first electrical connector 210 can define a mating end 211a that is configured to mate with the interconnect module 202 so as to place the electrical contacts 218 in electrical communication with the interconnect module 202. For instance, the first connector housing 216 can define a receptacle 220 at the mating end 211a that is configured to receive the interconnect module 102 so as to mate the interconnect module 102 with the first electrical connector 210. The first electrical connector 210 further defines a mounting end 211b that is configured to be mounted to the host substrate 208 so as to place the electrical contacts 218 in electrical communication with the host substrate 208. The first electrical connector 210 can be configured as a right-angle connector as illustrated. Alternatively, the first electrical connector 210 can be configured as a vertical connector as desired.

The second electrical connector 212 can be configured as described above with respect to the second electrical connector 154 illustrated in FIG. 1A. Thus, the second electrical connector can include an electrically insulative second connector housing 222 and a second plurality of electrical contacts 224 that are supported by the second connector housing 222. For instance, the second plurality of electrical contacts 224 can be arranged in at least one row that is oriented along the lateral direction A. The second electrical connector 212 further defines a mating end 213a that is configured to mate with the interconnect module 202 so as to place the electrical contacts 224 in electrical communication with the interconnect module 202, and a mounting end 213b that is configured to be mounted to the host module 108 so as to place the electrical contacts 224 in electrical communication with the host module 108. For instance, the second plurality of electrical contacts 224 can extend out of from the second connector housing 222 along the transverse direction T. In particular, the second plurality of electrical contacts 224 can define mating regions 225 that extend from the second connector housing 222 in an upward direction away from the host substrate 208. Thus, electrically conductive lands of the interconnect module 202 can be brought onto the mating regions 225 of respective ones of the second plurality of electrical contacts 224 in a downward direction, so as to mate the interconnect module 202 with the second electrical connector 212. The second electrical connector 212 further defines a mounting end 213b that is configured to be mounted to the host substrate 208 so as to place mounting ends of the electrical contacts 224 in electrical communication with the host substrate 208.

The terms "upward," "upper," "up," "above," and derivatives thereof are used herein with reference to the upward direction. The terms "downward," "lower," "down," "below," and derivatives thereof are used herein with reference to the downward direction. Of course, it should be appreciated that the actual orientation of the interconnect system 200 can vary during use, and that the terms upward and downward and their respective derivatives can be consistently used as described herein regardless of the orientation of the interconnect system 200 and components thereof during use.

While the first electrical contacts 218 and the second electrical contacts 224 can be supported by first and second connector housings 216 and 222 as described above, it should be appreciated that the first and second electrical contacts 218 and 224 can alternatively be included in a single electrical connector. Thus, the first and second electrical contacts 218 and 224 can be supported by a single monolithic connector housing. It should thus be appreciated that the host module 206 can include first and second pluralities of electrical contacts 218 and 224, respectively, that are supported by the host substrate 208. In particular, the first and second pluralities of electrical contacts 218 and 224 can be supported by at least one electrically insulative connector housing that, in turn, is mounted to the host substrate 208. In one example, the host module 206 can include a single electrical connector having a connector housing that supports both the first and second pluralities of electrical contacts 218 and 224. Otherwise stated, the connector housing of the first electrical connector 210 can be monolithic with the connector hosing second electrical connector 212. Alternatively, the host module 206 can include the first and second electrical connectors 210 and 212 having respective connector housings that are separate from each other as described above. In each of these examples, it can be said that the first and second pluralities of electrical contacts 218 and 224 are supported by the host substrate 208. For instance, the first and second pluralities of electrical contacts 218 and 224 can be mounted to the host substrate 208.

The host module 206 can be configured such that the first electrical connector 210 is configured to route high speed electrical signals between the host substrate 208 and the interconnect module 102. The second electrical connector 212 can be configured to route low speed electrical signals between the host substrate 208 and the interconnect module 102. Thus, electrical signals can be routed through the first electrical connector 210 at a first maximum data transfer rate, and electrical signals can be routed through the second electrical connector 212 at a second maximum data transfer rate that is less than the first maximum data transfer rate. In one example, the first electrical connector 210 can be configured to transmit electrical signals at data transfer speeds of at least 10 Gigabits per second. Electrical power can also be routed through the second electrical connector 212. While the first electrical connector 210 may be configured to receive high speed electrical signals, and the second electrical connector 212 may be configured to receive low speed electrical signals, power signals, or both it should be appreciated that the first and second electrical connectors 210 and 212 can be alternatively configured as desired.

Figure 5A:
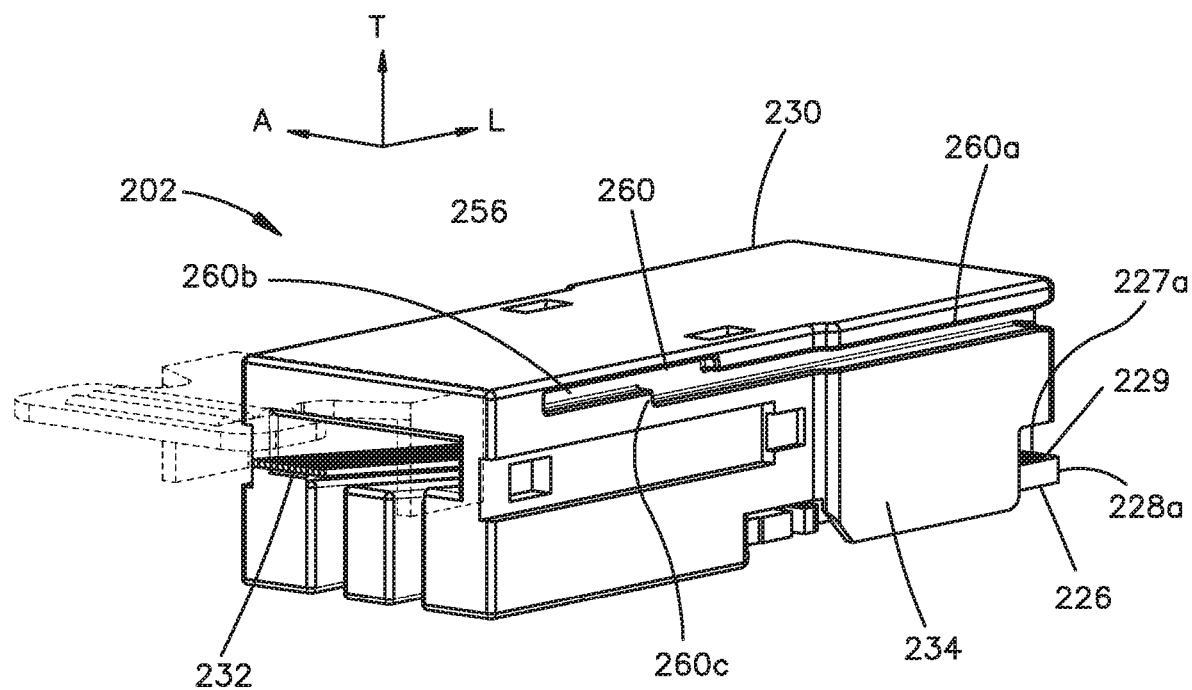
FIG. 5A is a perspective view of the interconnect module illustrated in FIG. 2.
Figure 5B:
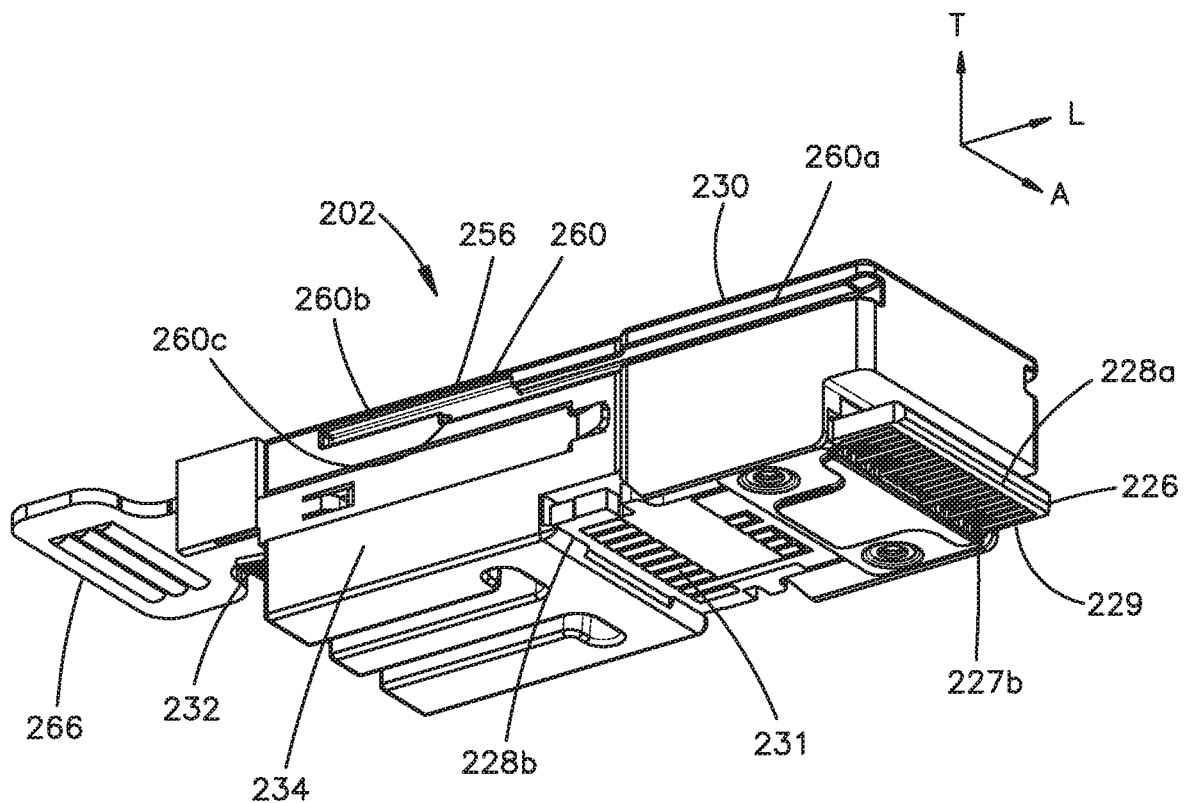
FIG. 5B is another perspective view of the interconnect module illustrated in FIG. 5A.

Referring now to FIGS. 5A-5B, the interconnect module 202 can include an interconnect substrate 226 that defines a top surface 227a and a bottom surface 227b that is opposite the top surface 227a along the transverse direction T. The top surface 227a can be said to be spaced from the bottom surface 227b in an upward direction, and the bottom surface 227b can be said to be spaced from the top surface 227a in a downward direction that is opposite the upward direction. The interconnect substrate 226 can further define a first end 228a and a second end 228b that is opposite the first end 228a along the longitudinal direction L. In particular, the first end 228a can be spaced from the second end 228b in the forward direction. Similarly, the second end 228b can be said to be spaced from the first end 228a in the rearward direction. Thus, the first end 228a can be referred to as a front end, and the second end 228b can be referred to as a rear end. The interconnect substrate 226 can also be referred to as a first substrate. The host substrate 208 can be referred to as a second substrate. The interconnect substrate 226 can be configured as a printed circuit board.

The interconnect module 202 can include a first plurality of electrically conductive members that can be configured as first electrical lands 229 that are carried by the interconnect substrate 226. For instance, the lands 229 can be disposed proximate to the first end 228a of the interconnect substrate. In this regard, it should be appreciated that the first end 228a can define an edge card configured for reception in the receptacle 220 of the first electrical connector 210 so as to mate the interconnect substrate 226 with the first electrical connector 210. In one example, the lands 229 can be arranged in a top row that is carried by the top surface 227a. The lands 229 can further be arranged in a bottom row that is carried by the bottom surface 227b. The top row of lands 229 and the bottom row of lands 229 can be aligned with each other along the transverse direction T. The lands 229 of each row can be aligned with each other along the lateral direction A. The electrical lands 229 can be configured to mate with respective ones of the electrical contacts 218 of the first electrical connector 210 when the interconnect module 202 is mated with the first electrical connector 210. In particular, a front edge of the interconnect substrate 226 can be inserted into the receptacle 220 of the first electrical connector 210 so as to cause the interconnect module 202 to mate with the first electrical connector 210.

The interconnect module 202 can further include a second plurality of electrically conductive members that can be configured as second electrical lands 231 that are carried by the interconnect substrate 226. For instance, the second electrical lands 231 can be spaced from the lands 229 in the rearward direction. Thus, the first lands 229 can be referred to as front lands, and the second lands 231 can be referred to as rear lands. The electrical lands 231 can be supported by the bottom surface 227b of the interconnect substrate 226. The electrical lands 231 can be to mate with respective ones of the electrical contacts 224 of the second electrical connector 212 when the interconnect module 202 is mated with the second electrical connector 212. The first and second lands 229 and 231 can mate with the respective first and second electrical connectors 210 and 212 substantially simultaneously. Alternatively, the first lands 229 can mate with the first electrical connector 210 before the second lands 231 mate with the second electrical connector 212. Alternatively still, the second lands 231 can mate with the second electrical connector 212 before the first lands 229 mate with the first electrical connector 210.

While the interconnect module 202 can include the first and second electrical lands 229 and 231 supported by the interconnect substrate 226 as described above, it should be appreciated that the interconnect substrate 226 can support any number of lands as desired in addition to the first and second lands. For instance, the interconnect substrate 226 can support a third plurality of lands. The third plurality of lands can be disposed between the first and second pluralities of lands 229 or 231 with respect to the longitudinal direction. Alternatively, the third plurality of lands can be disposed at any suitable alternative location as desired. The third plurality of lands can be configured to mate with respective ones of third electrical contacts of the host module 206. The third electrical contacts of the host module 206 can be supported by a third electrically insulative housing that can be separate from one or both of the first and second connector housings 216 and 222, respectively. Alternatively, the third electrically insulative housing can be monolithic with one or both of the first and second connector housings 216 and 222, respectively, as desired. The third plurality of lands can be arranged in at least one row that can be oriented along the lateral direction L. In one example, the third plurality of lands can be carried by the bottom surface 227b of the interconnect substrate 226. Thus, the interconnect module 202 can include any number of lands that are configured to be mate with respective ones of any number of electrical connectors of the host module 206 having connector housings that can be monolithic with each other or separate from each other as desired.

The interconnect module 202 can include at least one cable 232, such as a plurality of cables 232. In one example, the interconnect module 202 can be configured as a transceiver 230 that includes an optical engine that can be mounted onto the interconnect substrate 226. The cables 232 can thus include optical cables that are configured to carry optical signals. The optical engine of the transceiver 230 can be configured to receive optical signals, convert the optical signals to electrical signals, and output the electrical signals to the at least one electrical connector of the host module 206. Further, the optical engine can be configured to receive electrical signals, convert the electrical signals to optical signals, and transmit the optical signals along the cables 232. The interconnect substrate 226 can include an IC chip that is configured to route and/or modify the electrical signals transmitted to and from the transceiver 230, including conditioning or reshaping the electrical signals for protocol specific data transfers. In alternative embodiments, the interconnect module 202 may be a transmitter or receiver instead of a transceiver. In the case of a transmitter, the optical engine receives electrical signals and transmits them as optical signals along the cable 232. In the case of a receiver, the optical engine receives optical signals and transmits them to the host module 206 as electrical signals.

As described above, the interconnect module 202 is configured to mate with both the first electrical connector 210 and the second electrical connector 212. During operation, optical signals received by the transceiver from the cables 232 are converted to electrical signals. Ones of the electrical signals are routed to the first electrical connector 210, while others of the electrical signals are routed to the second electrical connector 212. For instance, high speed electrical signals can be routed to the first electrical connector 210, and low speed electrical signals can be routed to the second electrical connector 212. In one example, the first electrical connector 210 can be configured to transmit electrical signals at data transfer speeds of at least 10 Gigabits per second. Electrical power can also be routed to the second electrical connector 212. Conversely, the interconnect module 202 can receive electrical signals from one or both of the first and second electrical connectors 210 and 212, convert the electrical signals into optical signals, and output the optical signals to the optical cables 232.

In one example, the cables 232 can be configured as electrically conductive cables that are configured to carry electrical signals. Thus, the interconnect module 202 can be configured to receive electrical signals from the cables 232, route ones of the electrical signals to the first electrical connector 210, and others of the electrical signals to the second electrical connector 212. Of course, if the cable 116 includes only electrical cables, the transceiver can be provided without the optical engine. It should thus be appreciated that the interconnect module 202 can also be referred to in some embodiments as a electrical input/output (I/O) module. Thus, the interconnect module 202 can be referred to as a data communications module, which can be configured as a transceiver or an I/O module.

Figure 3A:
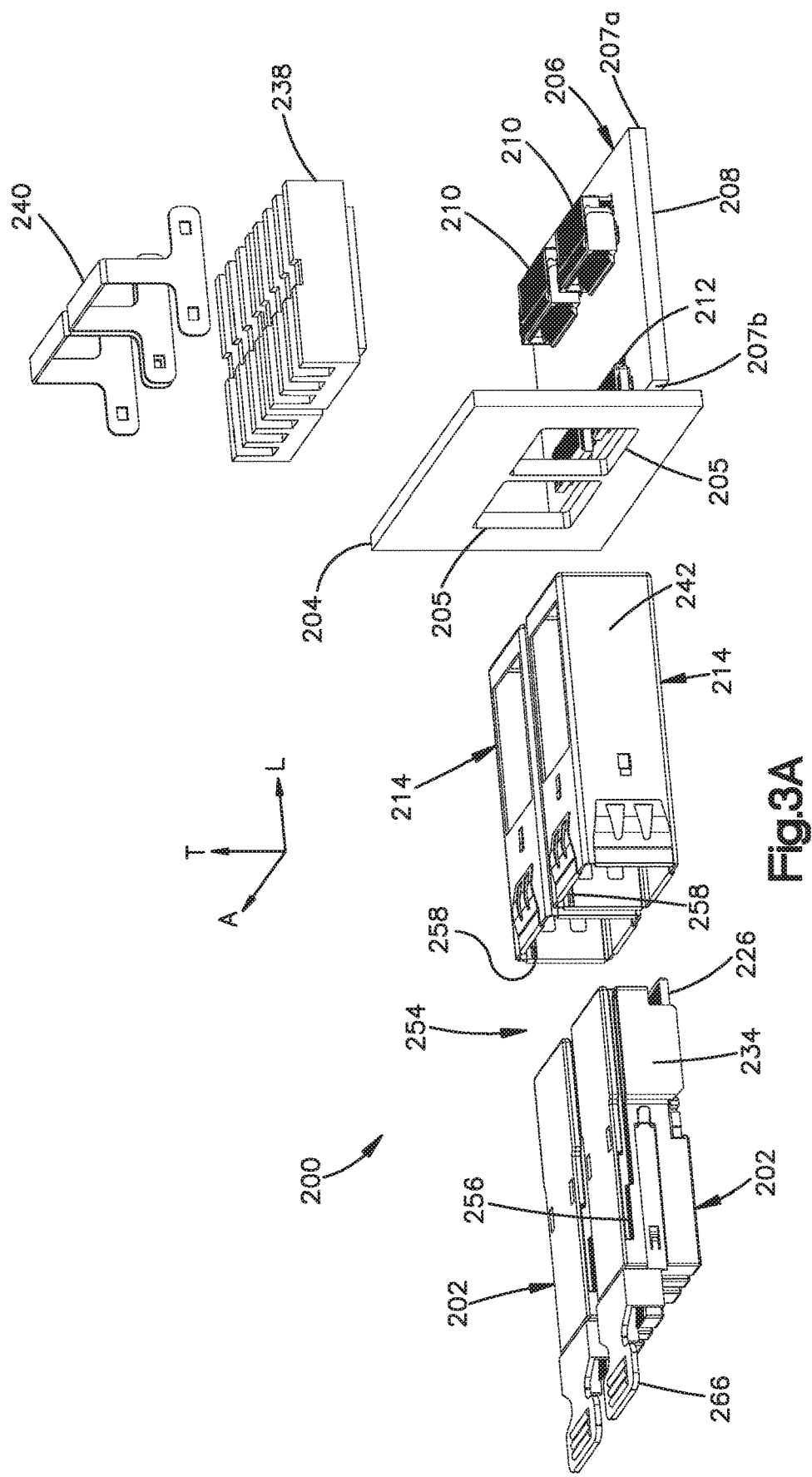
FIG. 3A is an exploded perspective view of the interconnect system illustrated in FIG. 2.

With continuing reference to FIGS. 5A-5B, the interconnect module 202 further includes a module housing 234 that can house the optical engine and the IC chip. The module housing 234 can be electrically conductive. The module housing 234 can support the interconnect substrate 226. The top surface 227a can face the module housing 234, and the bottom surface 227b can face away from the module housing 234. The cables 232 can extend out a rear surface of the module housing 234. In examples whereby the interconnect module 202 is configured as the transceiver 230, the module housing 234 can be a metallic housing. The metallic module housing 234 can provide electrical shielding for the optical engine. Alternatively or additionally, the module housing 234 can transfer heat away from the optical engine. Further, as illustrated in FIGS. 3A-3B, the interconnect module 202 can include a heat sink 238 that is configured to be placed in thermal communication with the module housing 234. In one example, the heat sink 238 can be placed in thermal communication with the module housing 234 and secured to the cage 214. Any suitable fastener 240 can secure the heat sink 238 to the cage 214. In one example, the heat sink 238 extends from the cage 214 in the upward direction.

Referring now to FIGS. 3A-5B generally, during operation, the first end 228a of the interconnect substrate 226 can be configured to be inserted into the receptacle 220 of the first electrical connector 210 as it is advanced in the forward direction so as to cause the first electrical lands 229 of the interconnect substrate 226 to mate with respective ones of the first plurality of electrical contacts 218 of the first electrical connector 210. In particular, the top row of electrical lands 229 can mate with the mating regions of the first electrical contacts 218 of the top row of the first electrical connector 210. Similarly, the bottom row of electrical lands 229 can made with respective ones of the mating regions of the first electrical contacts 218 of the bottom row of the first electrical connector 210. Further, the second electrical lands 231 can mate with mating regions 225 of the second plurality of electrical contacts 224 of the second electrical connector 212.

Referring now to FIGS. 3A-3B and 6A-6B, and as described above, the interconnect system 200 can include the cage 214. The cage 214 can be configured to be mounted to the panel 204 or mounted to the host substrate 208 and aligned with a panel aperture 205, and can further be configured to receive the interconnect module 202. The panel 204 can define a first side 204a, a second side 204b opposite the first side along the longitudinal direction L, and the aperture 205 that extends through the panel 204 from the first side 204a to the second side 204b. The first side 204a can be spaced from the second side 204b in the forward direction. The aperture 205 can be sized to receive the cage 214. Alternatively, the rear end of the cage 214 can terminate without passing through the panel 204. Further, the rear end of the cage 214 can have a cross-sectional outer dimension substantially equal to that of the aperture 205. Thus, it can be said that the cage 214 can be supported relative to the panel 204.

In one example, the cage 214 can define a cage body 242, and a bore 244 that extends through the cage body 242. The cage body 242 can define a front end 243 and a rear end 245 opposite the front end 243 along the longitudinal direction L. The bore 244 can extend from the rear end 245 toward the front end in the forward direction. The bore 244 can terminate without extending through the rear end 245. The cage body 242 can include first and second side walls 241 that are opposite each other along the lateral direction A. The side walls 241 can extend from the front end 243 to the rear end 245. The cage body 242 can further define a top 250 and a bottom 249 opposite the top 250 along the transverse direction T. The top 250 and bottom 249 can each extend from the front end 243 to the rear end 245 along the longitudinal direction L, and from the first side wall 241 to the second side wall 241 along the lateral direction A. The cage body 242 can include a top wall 249 that defines the top 250 of the cage body 242. The cage body 242 can define at least one aperture 251 that extends through the bottom 249 in the upward direction and is in communication with the bore 244. For instance, the cage body 242 can include a bottom wall 253, and the at least one aperture 251 extends through the bottom wall 253. The at least one aperture 251 can include a pair of apertures 251 spaced from each other along the longitudinal direction L, wherein a first one of the apertures 251 is sized to receive the first electrical connector 210, and a second one of the apertures 251 is configured to receive the second electrical connector 212. Alternatively, the at least one aperture 251 can be a single aperture configured to receive both electrical connectors 210 and 212. Alternatively still, the bottom 249 can be devoid of the bottom wall 253, such that the bottom 249 defines the single aperture 251 that extends from the front end 243 to the rear end 245, and from the first side to the second side.

The bore 244 can be sized to receive the interconnect module 202 as the interconnect module 202 is inserted through the aperture 205 of the panel 204. The cage body 242, and further the cage 214, can be metallic or can include any suitable alternative electrically conductive material. Thus, the cage 214 can be configured to provide electrical shielding for the interconnect module 202. Alternatively, at least a portion up to an entirety of the cage body 242, and further the cage, 214, can be made of any suitable electrically nonconductive material if desired. The bore 244 can extend through the cage body 242 along the longitudinal direction L. The cage 214 can be configured to be mounted to the panel 204, or mounted to the host substrate 208 and aligned with the aperture 205 of the panel 204. The interconnect module 202 can be inserted into the bore 244 of the cage 214. In one example, the interconnect module can be inserted into the bore 244 after the cage 214 has been mounted to the panel 204. Thus, when the cage 214 is mounted to the panel 204, the cage body 242 is configured to support the interconnect module 202 while at least a portion of the interconnect module is disposed in the bore 244 of the cage 214.

The cage 214 can be mounted to one or both of the panel 204 and the host substrate 208 as desired, such that the bore 244 of the cage is aligned with the aperture 205 of the panel 204. For instance, the cage 214 can include an attachment member 246 that is configured to attach to the host module 206. In one example, the attachment member 246 can be configured as at least one clip 247 such as a plurality of clips 247 configured to attach to the panel 204. The clip 247 can extend from the cage body 242 and can be configured to receive and capture the panel 204 when the cage 214 is inserted into the aperture 205. In one example, the cage 214 is inserted into the aperture 205 in the forward direction until the panel 204 is captured in the clip 247. When the cage 214 is attached to the panel 204, the first and second electrical connectors extend in the upward direction through the bottom 249 of the cage 214. It should be appreciated, however, that the cage 214 can be attached to the host module 206 in any manner as desired. For instance, the attachment member 246 can be configured as hardware such as screws that can secure the cage 214 to the panel 204. Further still, it should be appreciated that the attachment member 246 can secure the cage 214 to any suitable alternative structure of the host module 206. In one example, the attachment member 246 can secure the cage 214 to the host substrate 208. For example, the attachment member 246 can include at least one press-fit pin that fits into a corresponding aperture in the host substrate 208. The attachment members 246 can provide electrical contact between the cage body 242 and the panel 204 so as to provide electromagnetic interference shielding and prevent leakage.

Referring now to FIGS. 3A and 5A-6A the interconnect system 200 can include a guidance system 254 that directs the interconnect module 202 to mate with the first and second electrical connectors 210 and 212 when the interconnect module 202 is mated to the host module 206 through the panel 204. In particular, the guidance system 254 can guide the interconnect module 202 to mate with the first electrical connector 210 by moving the interconnect module 202 in the forward direction relative to the panel 204, and thus also relative to the host module 206, until the interconnect substrate 226 is mated with each of the first and second electrical connectors 210 and 212. It should be appreciated that the host module 206 can be maintained at a fixed position with respect to the panel 204 as the interconnect module 202 is inserted through the panel 204 so as to mate with the host module 206. For instance, the host substrate 208 can be attached to the panel 204.

When the cage 214 and the host substrate 208 are fixed with respect to movement relative to each other and the panel 204, the interconnect module 202 can be inserted into the cage 214. In particular, the interconnect module 202 is inserted into the cage until the interconnect module 202 mates with the first and second electrical connectors 210 and 212. In particular, the top and bottom rows of the first plurality of lands 229 mate with the top and bottom rows of the mating regions of the electrical contacts 218, respectively, of the first electrical connector 210. Further, the second plurality of lands mate with the electrical contacts 224 of the second electrical connector 212. As the interconnect module 202 is moved in the forward direction so as to mate with the first and second electrical connectors 210 and 212, it is recognized that the first plurality of lands 229 move past the second electrical connector 212. In particular, the first plurality of lands 229 moves from a first position whereby the lands 229 are spaced from the mating regions 225 of the second electrical contacts 224 in the rearward direction to a second position whereby the lands 229 are spaced from the mating regions 225 of the second electrical contacts 224 in the forward direction. In one example, the interconnect module 204 can be guided such that the lands 229 of the bottom row of lands 229 are prevented from wiping against the second electrical contacts 224 as they move past the mating regions 225 in the forward direction. In particular, the lands 229 of the bottom row of lands 229 can be prevented from wiping against the mating regions 225 as they move past the mating regions 225 in the forward direction.

In one example, the guidance system 254 can guide the interconnect module 202 to mate with the first and second electrical connectors 210 and 212 while preventing the first lands 229 from wiping against the second electrical contacts 224 as they move past the second electrical contacts 224 in the forward direction. In particular, the first lands 229 are spaced from the second electrical contacts 224 so as to define a gap therebetween as they move past the second electrical contacts 224 in the forward direction. In one example, the first lands 229 that are carried by the bottom surface 227b of the interconnect substrate 226 are spaced from the second electrical contacts 224 along the transverse direction T so as to define a gap therebetween as they move past the second electrical contacts 224 in the forward direction. Thus, the gap can extend along the transverse direction. In one particular example, the first lands 229 that are carried by the bottom surface 227b of the interconnect substrate 226 are spaced from the second electrical contacts 224 in the upward direction as they move past the second electrical contacts 224 in the forward direction. Once the interconnect module 202 has been moved to a position whereby the lands 229 are disposed forward of at least the mating regions 225 of the second electrical contacts 224, the guidance system 254 can cause the interconnect module 202 to move in the downward direction toward the host substrate 208. Thus, when the interconnect module 202 mates with the first electrical connector 210, the second plurality of lands 231 contact respective ones of the mating regions 225 of the second electrical contacts 224. Otherwise stated, the guidance system 254 can cause the interconnect module 202 to move in the downward direction until the second plurality of lands 231 are substantially coplanar with the mating regions 225 of the second electrical contacts 224 along a plane that includes the longitudinal direction L and the lateral direction A. In one example, the second plurality of lands 231 can be aligned with the mating regions 225 along the longitudinal direction L.

The guidance system 254 can include a first guide member 256 that is carried by interconnect module 202 and a second guide member 258 that is carried by the cage 214. The first and second guide members 256 and 258 are configured to engage each other so as to guide the interconnect module 202 to mate with the first and second electrical connectors 210 and 212 in the manner described above. In one example, the first and second guide members 256 and 258 can engage each other so as to cause the interconnect substrate 226 to move along the transverse direction T as it moves in the forward direction so as to mate with the first and second electrical connectors 210 and 212. For instance, the first and second guide members 256 and 258 can engage each other so as to maintain the first lands 229 that are carried by the bottom surface 227b of the interconnect substrate 226 spaced from the second electrical contacts 224 as the first lands 229 move past the second electrical contacts 224 in the manner described above.

The first guide member 256 can be carried by the module housing 234. For instance, the first guide member 256 can be carried by an outwardly-facing surface of the module housing 234. In one example, the first guide member 256 can be carried by a side wall of the module housing 234 that is opposite a second side wall of the module housing 234 along the lateral direction A. For example, the first guide member 256 can be carried by each of the first and second side walls of the module housing 234. The first guide member 256 can be configured as at least one recess 260, which can also be referred to as a guide recess. Thus, the at least one recess 260 can extend into the module housing 234. For instance, the at least one recess 260 can extend into the module housing 234 along the lateral direction A. In one example, the at least one recess 260 can extend into a corresponding at least one of the side walls of the module housing 234. For instance, a recess 260 can extend into both side walls of the module housing 234.

The second guide member 258 can be carried by the cage 214. For instance, the second guide member 258 can be carried by an inwardly-facing surface of the cage 214. In one example, the second guide member 258 can be carried by one of the first and second side walls 241 of the cage 214. For example, the second guide member 258 can be carried by each of the first and second side walls 241 of the cage 214. The second guide member 258 can be configured as at least one projection 262, which can also be referred to as a guide projection. Thus, the at least one projection 262 can extend out from a corresponding at least one of the side walls 241 toward the other one of the side walls 241. Thus, the at least one projection 262 can extend into the bore 244 of the cage 214.

The at least one projection 262 is configured to be received in the at least one recess 260 so as to define the guidance system 254 that guides the interconnect module 202 to mate with the first and second electrical connectors 210 and 212. In particular, referring now to FIGS. 7A-7F, the at least one recess 260 can include a first length 260a and a second length 260b. At least a portion of the first and second lengths 260a and 260b are spaced from each other along the longitudinal direction L. For instance, at least a portion of the first length 260a can be spaced from at least a portion of the second length 260b in the forward direction. In one example, an entirety of the first length 260a can be spaced from an entirety of the second length 260b in the forward direction. Further, at least a portion of the first length 260a can be offset from at least a portion of the second length 260b along the transverse direction T. For instance, an entirety of the first length 260a can be offset from an entirety of the second length 260b along the transverse direction T. In one example, the at least a portion of the first length 260a can be offset from the at least a portion of the second length 260b in the downward direction. Thus, the entirety of the first length 260a can be offset from the entirety of the second length 260b in the downward direction.

The recess 260 can further include a jog 260c that is connected between the first length 260a and the second length 260b. For instance, the jog 260c can extend from the first length 260a to the second length 260b. In one example, the jog 260c defines a first portion that extends from the first length 260a and a second portion that extends from the second length 260b. At least a portion of the jog 260c up to an entirety of the jog 260c can extend along the upward direction as it extends from the first length 260a to the second length 260b. The first portion of the jog 260c can be offset with respect to the second portion of the jog 260c in the downward direction. In one example, the first and second portions of the jog 260c can be aligned with each other along the transverse direction T. Alternatively, the first and second portions of the jog 260c can be offset from each other along the longitudinal direction. For instance, the first portion of the jog 260c can be offset with respect to the second portion of the jog 260c in the forward direction. The jog 260c can extend along a curved direction between the first and second lengths 260a and 260b. Thus, the jog 260c can provide a smooth transition between first length 260a and second length 260b. This promotes the ability for the projection 262 to travel through the jog 260c while the interconnect module 206 is being inserted or removed from the cage.

The first length 260a can define a first leading end and a first trailing end that is offset from the first leading end in the rearward direction. The first leading end can define a leading end of the recess 260. The second length 260b can similarly define a second leading end and a second trailing end that is offset from the second leading end in the rearward direction. The second trailing end can define a trailing end of the recess 260. The first leading end of the first length 260a can be offset with respect to the second trailing end of the second length 260b in the downward direction. It is appreciated that the downward direction can extend toward the host substrate 208, and the upward direction can extend away from the host substrate 208. The jog 260c can extend from the first trailing end to the second leading end. For instance, the first portion of the jog 260c can extend from the first trailing end, and the second portion of the jog 260c can extend from the second leading end. Thus, it will be appreciated that at least a portion up to an entirety of the jog 260c can be oriented perpendicular to one or both of the first and second lengths 260a and 260b, respectively. Alternatively or additionally, at least a portion up to an entirety of the jog 260c can be oriented obliquely with respect to one or both of the first and second lengths 260a and 260b, respectively. In one example, one or both of the first and second portions of the jog 260c can define respective ends of the jog 260c. Alternatively, one or both of the first and second portions of the jog 260c can be inwardly spaced from respective ends of the jog 260c.

At least a portion up to an entirety of the first and second lengths 260a and 260b can be oriented parallel to each other. For instance, the first leading end and the first trailing end of the first length 260a can be aligned with each other along the longitudinal direction L. Further, the second leading end and the second trailing end of the second length 260b can be aligned with each other along the longitudinal direction L. Alternatively, at least a respective portion up to a respective entirety of at least one or both of the first and second lengths 260a and 260b can be oriented oblique to the longitudinal direction L. It is recognized that the first and second lengths 260a and 260b can be inline and continuous with each other, and thus the recess 260 does not include the jog 260c in some examples.

Operation of the guidance system 254 will now be described with respect to FIGS. 7A-7F. As illustrated in FIG. 7A, the interconnect module 202 is positioned such that the first leading end of the first length 260a is aligned with the projections 262. Next, as illustrated in FIG. 7B, the interconnect module 202 can be inserted into the bore 244 of the cage 214 in the forward direction. The first leading end of the first length 260a can receive the projection 262 as the interconnect module 202 is moved in the forward direction inside the bore 244, and thus with respect to the host module 206. The projection 262 can be elongate along a direction that shares a common direction with a direction of orientation of one or both of the first and second lengths 260a and 260b. Thus, the projection 262 can be geometrically configured to prevent the interconnect module 202 from rotating about the projection 262. Once the projection 262 has been received in the first length 260a at the first leading end, the first lands 229 are spaced from the mating regions 225 in the rearward direction. For instance, the first lands 229 are spaced from the second electrical connector 212 in the rearward direction.

Next, referring to FIG. 7C, the interconnect module 202 is further inserted in the forward direction, which causes the projection 262 to slide along the first length 260a of the recess 260 toward the first trailing end. In this example, when the projection 262 is disposed in the first length 260a, the projection 262 engages the interconnect module 202 in the recess 260 so as to maintain the bottom row of the first lands 229 of the interconnect substrate 226 (see FIG. 3B) offset from the mating regions 225 of the second electrical contacts 224 in the upward direction. Thus, it will be recognized that the top row of first lands 229 is also offset from the mating regions 225 of the second electrical contacts 224 in the upward direction. As illustrated in FIG. 7D, the interconnect module 202 can be further inserted in the forward direction, which causes the projection 262 to slide along the first length 260a of the recess 260 further toward the first trailing end. In particular, the interconnect module 202 can be inserted in the forward direction until the first lands 229 are spaced from the mating regions 225 in the forward direction.

The interconnect module 202 can be inserted in the forward direction until the projection 262 is aligned with the jog 260c. In this position of alignment with the jog 260c, the projection 262 can be disposed at the first trailing end such that interference between the projection 262 and the interconnect module 202, and in particular the module housing 234, prevents further movement of the interconnect module 202 in the forward direction. Movement of the interconnect module 202 in the forward direction such that the projection 262 moves from the first leading end of the first length 260a to the first trailing end can be referred to as a first stroke of movement in the forward direction. When the projection 262 is aligned with the jog 260c, the first lands 229 can be spaced from the mating regions 225 in the forward direction.

Referring now to FIG. 7E, the interconnect module 202 can be moved in the downward direction which causes the projection 262 to move in the jog 260c in the upward direction. The interconnect module 202 can be moved in the downward direction until the projection 262 is aligned with the second leading end of the second length 260b. In particular, the projection 262 travels through the jog to a position that is aligned with the second leading end of the second length 260b along the longitudinal direction L. Thus, downward forces can cause the interconnect module 202 to move in the downward direction as the projection 262 rides in the jog 260c. When the projection 262 is aligned with the second leading end of the second length 260b, the interconnect substrate 226 can be aligned for mating with the first electrical connector 210. In particular, the front end 228a of the interconnect substrate 226 can be aligned with the receptacle 220 (see FIG. 4) of the first electrical connector 210. Further, the second lands 231 can be aligned to be mated with the mating regions 225 of the second electrical contacts 224 of the second electrical connector 212.

Thus, referring now to FIG. 7F, the interconnect module 202 can be moved further in the forward direction inside the bore 244 of the cage 214 during a second stroke of movement in the forward direction. As the interconnect module 202 is moved in the forward direction in the second stroke, the projection 262 travels from the second leading end toward the second trailing end. The interconnect module 202 can be moved in the forward direction during the second stroke until the interconnect module 202 mates with the first and second electrical connectors 210 and 212. In this regard, it should be appreciated that the bottom row of first electrical contacts 218 can be substantially coplanar with the mating regions 225 of the second electrical contacts 224 along a plane that is defined by the longitudinal direction L and the lateral direction A. The forward movement of the interconnect module 202 can cause the lands 231 to wipe against the mating regions 225 as they mate with the mating regions 225. The forward movement of the interconnect module 202 can further cause the lands 229 to wipe against the mating regions of the first electrical contacts 118 as the lands 229 mate with the first electrical contacts 118. It should be appreciated that when the projection 262 is disposed in the first length 260a of the recess 260 and in the second length 260b of the recess 260, mechanical interference between the projection 262 and the host module 202 can prevent the host module 202 from traveling in the downward direction with respect to the host module 206. For instance, when the module housing 234 defines the recess 260, the mechanical interference can be defined between the projection and the module housing 234. When the heat sink 238 (see FIGS. 5A-5B) is attached to the cage 214 and contacts the interconnect module 202 as described above, the weight of the heat sink can provide a downward force onto the module housing 234 that biases the interconnect module 202 in the downward direction as the projection travels along the jog 260c.

Because the front end 228a of the interconnect substrate 226 is received in the receptacle 220 of the first electrical connector 210, interference between the interconnect substrate 226 and the first connector housing 216 can prevent further forward motion of the interconnect module 202 in the bore 244 of the cage 214. Thus, the projection 262 can be spaced from the second trailing end of the second length 260b in the forward direction. Alternatively, the projection 262 can be disposed at the second trailing end when the interconnect module 202 is mated with the first and second electrical connectors 210 and 212. Thus, interference between the projection 262 and the interconnect module 202, and in particular the module housing 234, can alternatively or additionally prevent further movement of the interconnect module 202 in the forward direction with respect to the host module 206 after the interconnect module 202 has mated with the first and second electrical connectors 210 and 212. As the interconnect module 202 is mated to the host module 206 during the first and second strokes, the projection 262 can engage the interconnect module 202 in the first and second lengths 260a and 260b, respectively, so as to maintain the interconnect substrate 226 in an orientation along a plane that is defined by the longitudinal direction L and the lateral direction A.

When it is desired to unmate the interconnect module 202 from the host module 206, the interconnect module is moved in the rearward direction with respect to the host module 206 until the projection 262 travels along the second length 260b to the jog 260c, whereby the interconnect module 202 is unmated from the host module 206. When the projection 262 is disposed in the jog 260c, the interconnect module 202 can be moved in the upward direction with respect to the host module 206 until the projection 262 is aligned with the first length 260a. Movement of the interconnect module 202 offsets the bottom row of the lands 229 with respect to the mating regions 225 in the upward direction. Next, movement of the interconnect module 202 in the rearward direction causes the projection 262 to ride out of the first leading end of the first length 260a. The interconnect module 202 can then be removed from the cage 214. As the interconnect module 202 is removed from the cage 214, the bottom row of lands 229 travels past the mating regions 225 in the rearward direction at a location offset from the mating regions 225 along the transverse direction T. Thus, the bottom row of lands 229 are prevented from wiping against the mating regions 225. The interconnect module 202 can include a pull tab 266 that is configured to receive a force in the rearward direction that causes the interconnect module 202 to unmate from the first and second electrical connectors 210 and 212. The pull tab 266 can extend from the module housing 234 in the rearward direction in one example. Further, the pull tab 266 can be coupled to a latch that secures the interconnect module 202 to the host module 206 when the interconnect module 202 is mated to the host module 206. In particular, the latch can secure the interconnect module 202 to the cage 214. When a force is applied to the pull tab 266 in the rearward direction, the pull tab can cause the latch to become disengaged from the host module 206. Continued applied force to the pull tab 266 in the rearward direction cause the interconnect module 202 to unmate from the host module 206.

It should be appreciated that the recess 260 can include more than one jog 260c or as many jogs 260c as desired, such as at least one jog. Thus, the recess 260 can include any number of lengths greater than the first length 260a and the second length 260b as desired. Each of the lengths can receive the projection 262 which guides the interconnect module 202 to move in the forward direction, and each of the jogs can be connected between respective ones of a pair of the lengths. Further, while the jog 260c can extend along the transverse direction from the first length 260a to the second length 260b, it should be appreciated that the jog 260c can be alternatively configured in any manner as desired. In one example, the jog 260c can be oriented along a direction that is oblique to the longitudinal direction L. For instance, the jog 260c can extend in the upward direction as it extends in the rearward direction from the first length 260a to the second length 260b.

It will be appreciated that the recess 260 can be said to define a track that engages the host module 206 so as to cause the interconnect module 202 to move along the first stroke of forward movement, then along the downward direction, then along the second stroke of forward movement. If the interconnect module 202 includes the third row of lands described above, the third row of lands can also remain spaced above the mating regions 225 as it moves past the mating regions 225 in the forward direction before mating with its respective electrical connector on the host module 206.

As described above, the first guide member 256 can be configured as the at least one recess 260, and the second guide member 258 can be configured as the at least one projection 262. It should be appreciated that the at least one recess 260 can include first and second recesses that extends into the first and second side walls, respectively, of the module housing 234. Further, the at least one projection 262 can include first and second projections 262 that extend out from the first and second side walls 241, respectively, of the cage 214.

Further still, while the first guide member 256 is configured as the at least one recess 260 and the second guide member 258 is configured as at least one projection in one example, it should be appreciated that the first guide member 256 can alternatively be configured as the at least one projection 262, and the second guide member 258 can alternatively be configured as the at least one recess 260. In this example, the recess would include the first and second lengths 260a and 260b, and the transverse jog 260c that is connected between the first and second lengths 260a and 260b in the manner described above. The first length 260a would be further again be spaced from the second length 260b in the forward direction. The second length 260b would define the leading length, such that the at least one projection 262 would be received by the second length 260b, travel through the jog 260c, and travel from the jog 260c to the first length 260a until the interconnect module 202 is mated with the first and second electrical connectors 210 and 212. Thus, the first length 260a would be offset from the second length 260b in the downward direction. The first and second lengths 260a and 260b can be parallel to each other along the longitudinal direction L as described above. Alternatively, at least one a portion of or both of the first and second lengths 260a and 260b can extend along a direction oblique to the longitudinal direction L.

Further, the first and second guide members 256 and 258 can both be configured as at least one protrusion. For instance, the interconnect module 202 can include a projection extend out along the lateral direction A with respect to each of the opposed sides of the module housing 234. The cage 214 can similarly define a complementary shelf that extend in from each of the sides 241. The projections of the interconnect module 202 ride along the shelves of the cage 214 so as to maintain the first lands 229 spaced above the electrical contacts 224 of the second electrical connector 212 in the manner described above. The projections of the interconnect module 202 can ride off of the shelves of the cage 214 in the forward direction once the lands 229 have traveled to a position forward of the second electrical connector 212, at which point the interconnect module 202 drops in the downward direction so that the first lands 229 are aligned to be mated with the first electrical connector 210, and the second lands 231 are aligned to be mated with the second electrical connector 212 in the manner described above. For instance, the projections of the interconnect module 202 can ride off the shelves and onto respective platforms. The projections can ride along the platforms so as to guide the interconnect module 202 to mate with the first and second electrical connectors 210 and 212 in the forward direction as described above. The shelf and platform can contact the projection of the interconnect module 202 so as to prevent the interconnect module from movement in the downward direction with respect to the host module 206, but do not prevent the interconnect module 202 from movement in the upward direction with respect to the host module 206.

Further, while the first guide member 256 can be carried by the module housing 234 in one example, it should be appreciated that the first guide member 256 can be carried by any suitable alternative structure of the interconnect module 202. By way of example and not limitation, the first guide member 256 can be configured as a projection that extends out from the interconnect substrate 226. Further, while the second guide member 258 is carried by the cage 214 in one example, it should be appreciated that the second guide member 258 can be carried by any suitable alternative structure of the host module 206. For instance, by way of example and not limitation, the second guide member 258 can be carried by the host substrate 208. It should be appreciated that the relative position of the protrusion 262 and first and second lengths 260a and 260b length recesses can be reversed. That is instead of the cage 214 having a protrusion the interconnect module housing 234 may have a protrusion that engages with a slot in the cage. Also, as described above, the first guide member 256 can be configured as at least one projection. For instance, the first guide member 256 can be configured as first and second projections 262 that are offset from each other along the longitudinal direction L. Incorporating the first and second protrusions 262 can reduce the possibility of inadvertent tilting of the interconnect module 206 as it is being inserted or removed, which might result in electrical contact between the first lands and second connector contacts.

As described above, it is contemplated that the recess 260 may not include the jog 260c. In this example, the first length 260a can be oblique to the longitudinal direction L, such that the first trailing end is offset with respect to the first leading end in the upward direction. Further, the first trailing end can be open to the second leading end. Whether the projection 262 travels through the jog 260c to a position aligned with the second leading end, or whether the projection 262 travels to the first trailing end and is thus aligned with the second leading end, 1) the front end 228a of the interconnect substrate 226 can be aligned with the receptacle 220 (see FIG. 4) of the first electrical connector 210, and 2) the second lands 231 can be aligned to be mated with the mating regions 225 of the second electrical contacts 224 of the second electrical connector 212.

The guidance system 254 has been described in accordance with a first example whereby the interconnect module 202 is guided 1) from a first position along the transverse direction T whereby the bottom row of the lands 229 is offset in the upward direction with respect to both the mating regions 225 and the receptacle 220 2) to a second position along the transverse direction T whereby the bottom row of lands 229 is mated with the bottom row of mating regions of the first electrical contacts 218, the top row of lands 229 is mated with the top row of mating regions of the first electrical contacts, and the row of lands 231 is mated with the mating regions 225 of the second electrical contacts 224. In this first example, the interconnect module 202 is guided to move along the transverse direction T, and in particular in the downward direction, as it moves in the forward direction. In particular, the interconnect module 202 can be guided to move along the transverse direction T, and in particular in the downward direction, as it moves from a first stroke to a second stroke in the forward direction.

Referring now to FIGS. 8A-8B, the guidance system 254 (described above) can be configured to cause the mating regions 225 to move along the transverse direction T. In particular, the guidance system 254 can be configured to cause the mating regions 225 to move in the upward direction with respect to each of the mating regions of the first electrical contacts 218 of the first electrical connector 210 and the interconnect module 202. In a first or initial position, the mating regions 225 of the second electrical contacts 224 can be offset with respect to the bottom row of mating regions of the first electrical contacts 218 of the first electrical connector 210 in the downward direction. The mating regions 225 can be disposed in the first or initial position as the bottom row of lands 229 move from a first position whereby the bottom row of lands 229 is offset with respect to the mating regions 225 in the rearward direction to a second position whereby the bottom row of lands 229 is offset with respect to the mating regions 225 in the forward direction.

When the mating regions 225 are in the first or initial position, the mating regions 225 can also be offset with respect to the row of second plurality of lands 231 in the downward direction. Thus, once the bottom row of the first plurality of lands 229 is offset with respect to the mating regions 225 in the forward direction, the guidance system 254 can urge the mating regions 225 to move in the upward direction to a second position whereby the mating regions 225 are aligned with respective ones of the second plurality of lands 231 along the longitudinal direction. In particular, the guidance system 254 can urge the mating regions 225 to move to the second position when the mating regions 225 are disposed between the first lands 229 and the second lands 231 with respect to the longitudinal direction. In one example, the guidance system 254 can urge a portion of the second connector housing 222 to move in the upward direction so as to cause the mating regions 225 to similarly move in the upward direction.

In particular, the guidance system 254 can include the recess 260 and the projection 262 in the manner described above. In this example, however, the recess 260 can receive the projection 262 so as to guide the interconnect module 202 to move in the forward direction. The recess 260 can be oriented along the longitudinal direction L. The interconnect module 202 can include a biasing member 264 that is configured to engage with the second electrical connector 212 so as to urge the creating regions 225 to move in the upward direction with respect to the host substrate 208 and the lands 229 and 231 from the first or initial position to the second position. In one example, the biasing member 264 can cause a portion of the connector housing 222 to move in the upward direction, which in turn causes the mating regions 225 to move in the upward direction with respect to the host substrate 208 and the lands 229 and 231 from the first or initial position to the second position. In particular, the second connector housing 222 can define a first portion 222a that defines the mounting end 213b of the second electrical connector 212, and a second portion 222b that supports the mating regions 225 of the second electrical contacts 224. The second portion 222b can be movable with respect to the first portion 222a. In one example, the second portion 222b can be pivotally coupled to the first portion 222a. Alternatively, the biasing member 264 can alternatively engage the second electrical contacts 224 so as to urge the mating regions 225 to move from the first or initial position to the second position. Whether the biasing member 264 engages the connector housing 222, the electrical contacts 224, or some other engagement structure that causes the mating regions 225 to move in the upward direction, it can be said that the biasing member 264 biases the mating regions 225 in the upward direction to the second position.

During operation, the interconnect module 202 is positioned such that the leading end of the recess 260 is aligned with the projections 262. Next, the interconnect module 202 can be inserted into the bore 244 of the cage 214 in the forward direction. The leading end of the recess 260 can receive the projection 262 as the interconnect module 202 is moved in the forward direction inside the bore 244, and thus with respect to the host module 206. As the interconnect module 202 is further moved in the forward direction, the projection 262 engages the interconnect module 202 in the recess 260 so as to guide the interconnect module 202 to mate with the first electrical connector 210 in the manner described above. In one example, the recess 260 can be oriented in the longitudinal direction L, and the interconnect module 202 can thus be aligned for mating with the first electrical connector 210 when the projection 262 is received in the recess 260. As described above, movement of the interconnect module 202 in the forward direction with respect to the host module 206 causes the projection 262 to travel toward the trailing end of the recess 260. It should be appreciated that the recess 260 can have any suitable geometry and orientation as desired such that the projection 262 guides the interconnect module 202 in the recess 260 to mate with the first electrical connector 210. Further, it should be appreciated that when the projection 262 is disposed in the recess 260, mechanical interference between the projection 262 and the host module 202 can prevent the host module 202 from traveling in the downward direction with respect to the host module 206. For instance, when the module housing 234 defines the recess 260, the mechanical interference can be defined between the projection and the module housing 234.

When the projection 262 is received in the recess 260 and disposed at the leading end of the recess 260, the lands 231 are offset with respect to the mating regions 225 in the upward direction. The interconnect module 202 moves in the forward direction with respect to the host module 206 until the biasing member 264 engages the second electrical connector 212. Further movement of the interconnect module 202 relative to the host module 206 causes the biasing member 264 to bias the mating regions 225 in the upward direction to the second position in the manner described above. In one example, the basing member 264 can be wedge-shaped. Alternatively or additionally, the complementary engagement member of the second electrical connector 212 that engages the biasing member 264 can be wedge shaped. When the mating regions 225 are in the second position, the mating regions 225 are aligned with respective ones of the lands 231. Thus, it can be said that the guidance system 254 can include the biasing member 264. The biasing member 264 can be positioned such that movement of the mating regions 225 in the upward direction occurs when the mating regions 225 are aligned with the lands 231 along the transverse direction T. Alternatively, the biasing member 264 can be positioned such that movement of the mating regions 225 in the upward direction occurs when the lands 231 are offset with respect to the mating regions 225 in the rearward direction. Thus, forward movement of the interconnect module 202 with respect to the host module 206 causes the lands 231 to mate with respective ones of the mating regions 225. The forward movement of the interconnect module 202 can cause the lands 231 to wipe against the mating regions 225 as they mate with the mating regions 225. The forward movement of the interconnect module 202 can further cause the lands 229 to wipe against the mating regions of the first electrical contacts 118 as the lands 229 mate with the first electrical contacts 118.

Because the front end 228a of the interconnect substrate 226 is received in the receptacle 220 of the first electrical connector 210, interference between the interconnect substrate 226 and the first connector housing 216 can prevent further forward motion of the interconnect module 202 in the bore 244 of the cage 214. Thus, the projection 262 can be spaced from the second trailing end of the recess 260 in the forward direction. Alternatively, the projection 262 can be disposed at the trailing end of the recess 260 when the interconnect module 202 is mated with the first and second electrical connectors 210 and 212. Thus, interference between the projection 262 and the interconnect module 202, and in particular the module housing 234, can alternatively or additionally prevent further movement of the interconnect module 202 in the forward direction with respect to the host module 206 after the interconnect module has mated with the first and second electrical connectors 210 and 212. As the interconnect module 202 is mated to the host module 206, the projection 262 can engage the interconnect module 202 in the recess 260 so as to maintain the interconnect substrate 226 in an orientation along a plane that is defined by the longitudinal direction L and the lateral direction A.

When it is desired to unmate the interconnect module 202 from the host module 206, the interconnect module 202 is moved in the rearward direction in the bore 244 of the cage 214 with respect to the host module 206. As the interconnect module 202 is moved in the rearward direction, the projection 262 travels in the recess 260 in the forward direction, which guides the movement of the interconnect module 202 in the rearward direction. As the interconnect module 202 moves in the rearward direction, the interconnect member 202 unmates from the first and second electrical connectors 210 and 212. Further, the biasing member 264 disengages from the second electrical connector 212. Consequently, the mating regions 225 return to the first or initial position wherein the mating regions 225 are offset with respect to the bottom row of the lands 229 in the downward direction. Further movement of the interconnect module 202 with respect to the host module 206 can remove the interconnect module 202 from the cage 214. As the interconnect module 202 is removed from the cage 214, the bottom row of lands 229 travels past the mating regions 225 in the rearward direction at a location offset from the mating regions 225 along the transverse direction T. Thus, the bottom row of lands 229 are prevented from wiping against the mating regions 225. While the guidance system 265 can include the recess 260 and the projection 262 in the manner described above, it should be appreciated that the guidance system 265 can alternatively be defined by an inner surface of the cage body 242 that at least partially defines the bore 244, and an outer surface of the module housing 234 that rides along the inner surface of the cage body 242. Thus, the inner perimeter of the cage body 242 can define the first guidance member 256, and the outer perimeter of the module housing 234 can define the second guidance member 258.

Referring to FIGS. 9A-9B, the guidance system 254 can be constructed in accordance with yet another example. As described above with respect to FIGS. 8A-8B, the mating regions 225 can be disposed at first or initial position, the mating regions 225 of the second electrical contacts 224 can be offset with respect to the bottom row of mating regions of the first electrical contacts 218 of the first electrical connector 210 in the downward direction. Further, the bottom row of the first lands 229 can extend down from the interconnect substrate 226 to a first location, and the row of the second lands 231 can extend down from the interconnect substrate 226 to a second location that is offset in the downward direction with respect to the first location. The downward direction as applied to the bottom row of the first lands 229 and the second lands 231 can be away from the interconnect substrate 226.

When the projection 262 is received in the recess 260, the first end 228a of the interconnect substrate 226 can be aligned for mating with the first electrical connector 210 along the longitudinal direction L. Otherwise stated, the top row of the first lands 229 can be coplanar with the top row of the mating regions of the first electrical contacts 218 with along a respective plane that includes the longitudinal direction L and the lateral direction A. For instance, the top row of the first lands 229 can be aligned with respective ones of the top row of the mating regions of the first electrical contacts 218 along the longitudinal direction L. Further, the bottom row of the first lands 229 can be coplanar with the bottom row of the mating regions of the first electrical contacts 218 with along a respective plane that includes the longitudinal direction L and the lateral direction A. For instance, the bottom row of the first lands 229 can be aligned with respective ones of the bottom row of mating regions of the first electrical contacts 218 along the longitudinal direction L. Thus, the bottom row of the first lands 229 can be offset with respect to the mating regions 225 of the second electrical contacts 224 of the second electrical connector 212 in the upward direction. Further still, the second lands 231 can be substantially coplanar with the mating regions 225 of the second electrical contacts 224 with along a respective plane that includes the longitudinal direction L and the lateral direction A. For instance, the second lands 231 can be substantially aligned with respective ones of the mating regions 225 of the second electrical contacts 224 along the longitudinal direction L. Thus, movement of the interconnect substrate 226 in the forward direction will cause the second lands 231 to mate with the respective ones of the mating regions 225.

Thus, it should be appreciated that the bottom row of first lands 229 extends from the interconnect substrate 226 a first distance in the downward direction, and the second lands 231 extend from the interconnect substrate 226 a second distance in the downward direction that is greater than the first distance. Further, the second lands 231 can include a spring member that has a spring constant as the spring member compresses in the upward direction toward the interconnect substrate 226.

Thus, when the projection 262 is received in the recess 260, the interconnect module 202 is guided to move in the forward direction in the bore 244 of the cage 214 in the manner described above. As a result, the bottom row of the first lands 229 move past the mating regions 225 of the second electrical contacts 224 without wiping against the mating regions 225. For instance, the bottom row of the first lands 229 can be spaced from the mating regions 225 so as to define a gap therebetween. The gap can extend along the transverse direction T. During operation, the interconnect module 202 can be guided by the projection 262 to move in the forward direction with respect to the host module 206 until the interconnect module 202 mates with the first and second electrical connectors 210 and 212 in the manner described above. The forward movement of the interconnect module 202 can cause the lands 231 to wipe against the mating regions 225 as they mate with the mating regions 225. Further, in all examples described above, the top row of the first lands 229 can wipe against the top row of the first electrical contacts 218 as they mate with the top row of the first electrical contacts 218. Similarly, the bottom row of the first lands 229 can wipe against the bottom row of the first electrical contacts 218 as they mate with the bottom row of the first electrical contacts 218. As the interconnect module 202 is mated to the host module 206, the projection 262 can engage the interconnect module 202 in the recess 260 so as to maintain the interconnect substrate 226 in an orientation along a plane that is defined by the longitudinal direction L and the lateral direction A.

When it is desired to unmate the interconnect module 202 from the host module 206, the interconnect module 202 is moved in the rearward direction in the bore 244 of the cage 214 with respect to the host module 206. As the interconnect module 202 is moved in the rearward direction, the projection 262 travels in the recess 260 in the forward direction, which guides the movement of the interconnect module 202 in the rearward direction. As the interconnect module 202 moves in the rearward direction, the interconnect member 202 unmates from the first and second electrical connectors 210 and 212. Further, the bottom row of the first lands 229 remain offset with respect to the mating regions 225 in the upward direction. The interconnect module 202 can move in the rearward direction with respect to the host module 206 as the interconnect module 202 is removed from the cage 214. As the interconnect module 202 is removed from the cage 214, the bottom row of lands 229 travels past the mating regions 225 in the rearward direction at a location offset from the mating regions 225 along the transverse direction T. Thus, the bottom row of lands 229 are prevented from wiping against the mating regions 225. Referring to FIGS. 8A-9B, in one example, an entirety of the recess 260 that receives the protrusion 262 during mating of the interconnect module 202 to the host module 206 can be oriented along the longitudinal direction L. While the guidance system 265 can include the recess 260 and the projection 262 in the manner described above, it should be appreciated that the guidance system 265 can alternatively be defined by an inner surface of the cage body 242 that at least partially defines the bore 244, and an outer surface of the module housing 234 that rides along the inner surface of the cage body 242. Thus, the inner perimeter of the cage body 242 can define the first guidance member 256, and the outer perimeter of the module housing 234 can define the second guidance member 258.

Referring to FIGS. 7A-9B generally, it should be appreciated that the guidance system 254 can include the first and second lengths 260a and 260b in combination with the biasing member 264. Alternatively or additionally, when the guidance system 254 includes the first and second lengths 260a and 260b, the second lands 231 and the mating regions 225 of the second electrical contacts 224 can be offset with respect to the bottom row of the first lands 229 and the bottom row of the mating regions of the first electrical contacts 218, respectively, in the downward direction. Alternatively or additionally still, the guidance system 254 can include the biasing member 264 and the second lands 231 and the mating regions 225 of the second electrical contacts 224 can be offset with respect to the bottom row of the first lands 229 and the bottom row of the mating regions of the first electrical contacts 218, respectively, in the downward direction.

As illustrated in FIGS. 3A-3B, the interconnect system can include any number of interconnect modules 202 as desired that are each configured to be mounted to a common panel or different panels, and mated with respective first and second electrical connectors. While two interconnect modules 202 are shown, the interconnect system 200 can include any number of interconnect modules 202 as desired. Thus, the interconnect system 200 can include a plurality of cages 214 configured to receive individual ones of a respective plurality of the interconnect modules 202. The cages 214 can be stacked The cages 214 can be separate from each other or monolithic with each other as desired. Further, the interconnect modules 202 can be driven through respective different apertures of the panel 204, or through a common aperture of the panel 204. Further still, the interconnect modules 202 can be driven through the same panel 204 or different panels 204. It should also be appreciated that the host modules 206 to which the interconnect modules 202 are mated can share a common host substrate 208, or can include separate host substrates 208 as desired.

As described above, it is recognized that in some circumstances, it may be desired to mate and unmate the interconnect module 202 with the host module 206 through the panel 204. For instance, the interconnect module 202 can be "hot pluggable" through the panel 204, as described in more detail below. That is the interconnect module 202 can be mated with the host module 206 while power is being supplied to the host substrate 208. Because the front lands 229 pass over the second electrical connector 212 without making electrical contact with the second electrical contacts 224 as the interconnect module 202 is mated with the host module 206, the interconnect module 202 can be hot pluggable with the host module 206. When the host module 206 that is configured to mate with the interconnect module 202 through one or both of the panel 204 and the cage 214 can be referred to as a panel-mount host module 206. It is appreciated that the panel-mount host module 206 can include the cage 214 that is supported relative to the panel 204. For instance, the cage 214 can be supported at a fixed location relative to the panel 204. In one example, the cage 214 can be mounted to the panel 204. Alternatively or additionally, the cage 214 can be mounted to the host substrate 208. The host substrate 208 may in turn be mounted to the panel 204 via brackets or some other type of mounting hardware.

Figure 10A:
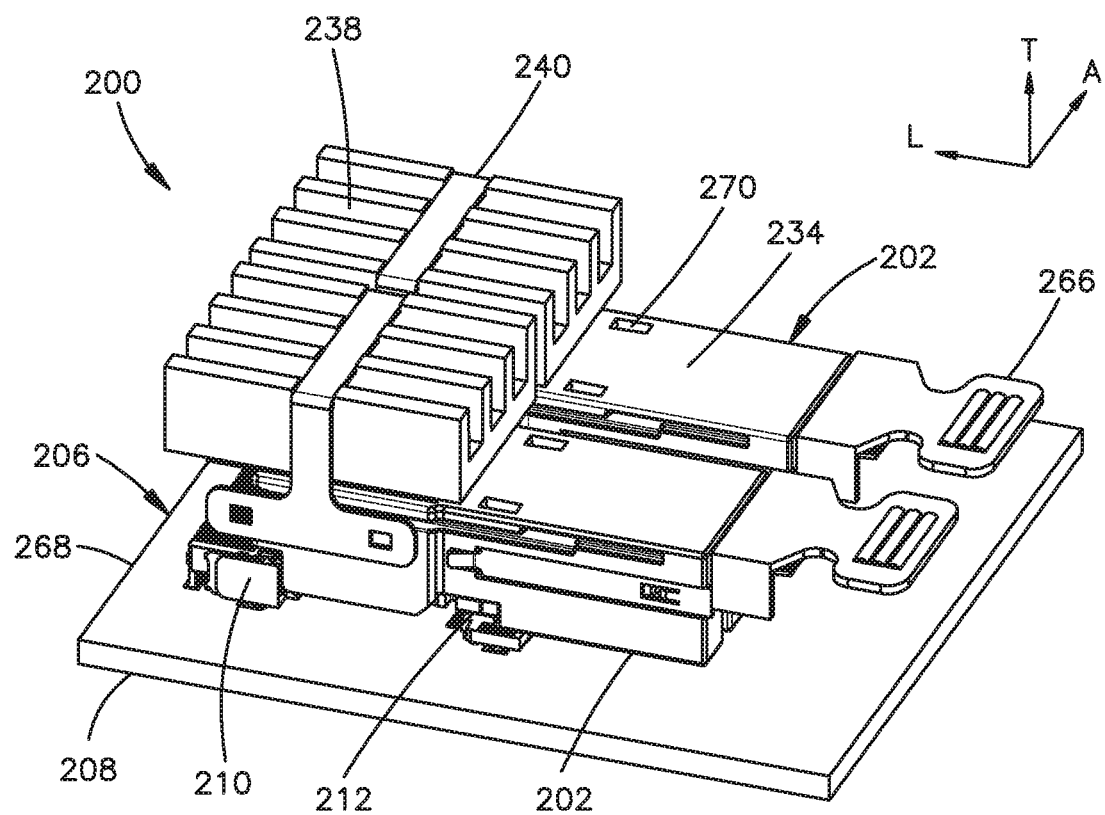
FIG. 10A is a perspective view of the interconnect system illustrated in FIG. 2, but showing an interconnect module mated to the host module at a mid board location of the host substrate.

Referring now to FIG. 10A, the present disclosure recognizes that the host substrate 208 can define a mid board location 268, and the interconnect module 202 can be mated to the mid board location 268. The term "mid board" can refer to a location where the interconnect module 202 is connected to the host substrate 208 not through a panel 204. In some examples, the mid board location 268 can be inwardly spaced from the outer perimeter of the host substrate 208. When the interconnect module 202 is mated to the host module 206 through the panel 204 as described above, it can be said that the interconnect module 202 is mated to an edge of the host substrate 208 that faces the panel 204, as described above.

The present disclosure recognizes that when mating interconnect modules 202 to a host module 206 through a panel, the number of interconnect modules 202 that can be mated with a host module can be limited by the dimensions of the panel. Also, when the interconnect module 202 is mated to the host module 206 through the panel 204, the electrical connections to the first connector 210 on the host substrate 208 are made proximate to the edge defined by the second end 207b of the host substrate 208, as described above. Accordingly, there may be long electrical transmission paths in the host substrate 208 between the first connector 210 and any integrated circuits where the high speed signals are processed or manipulated. Thus, the present disclosure recognizes that it can be desirable to allow the interconnect module 202 to make electrical connections with the host substrate 208 at locations unconstrained by the panel 204. Accordingly, it can be advantageous that the interconnect module 202 can selectively mate with the host module 206 both through the panel 204, and at the mid board location 268 of the host substrate 208 without passing through any panel. While conventional transceivers work well for either panel mount or mid board applications, the present disclosure provides a single transceiver that can be used interchangeably in both applications.

Thus, in some circumstances, it may be desired to mate the interconnect module 202 with the host module 206 at the mid board location 268 of the host substrate 208. The host module 206 including the mid board location 268 can be referred to as a mid board host module 206. Because the interconnect modules 202 mated to the host module 204 through the front panel 204 are disposed at the second edge of the host substrate 208, each host module 206 can only be mated to singular interconnect modules 202 that are arranged along respective rows oriented along the lateral direction A and spaced from each other along the transverse direction T. When interconnect modules 202 are mated to the host module 204 at the mid board location, additional interconnect modules can be mated to the host module 204 at locations spaced from each other along the longitudinal direction L, thereby resulting in a larger number of interconnect module 202 mated to the host module 204.

Figure 1B:
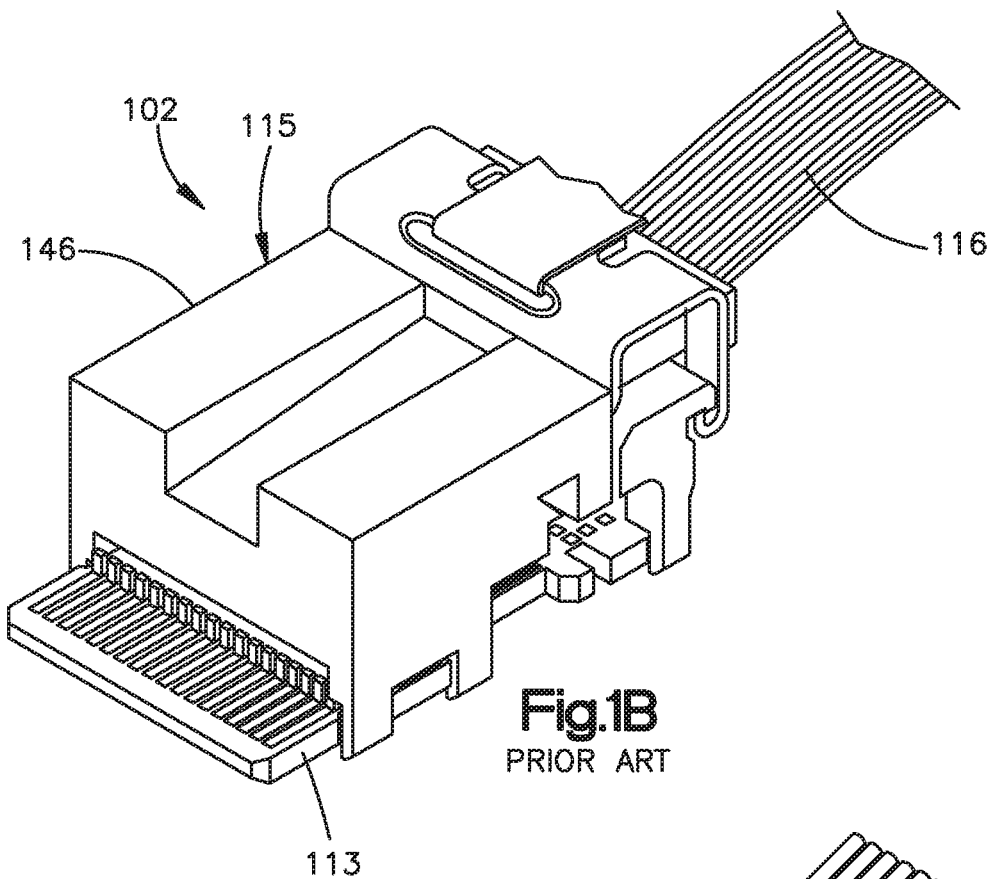
FIG. 1B is a perspective view of one example of the interconnect module of FIG. 1A.
Figure 1C:
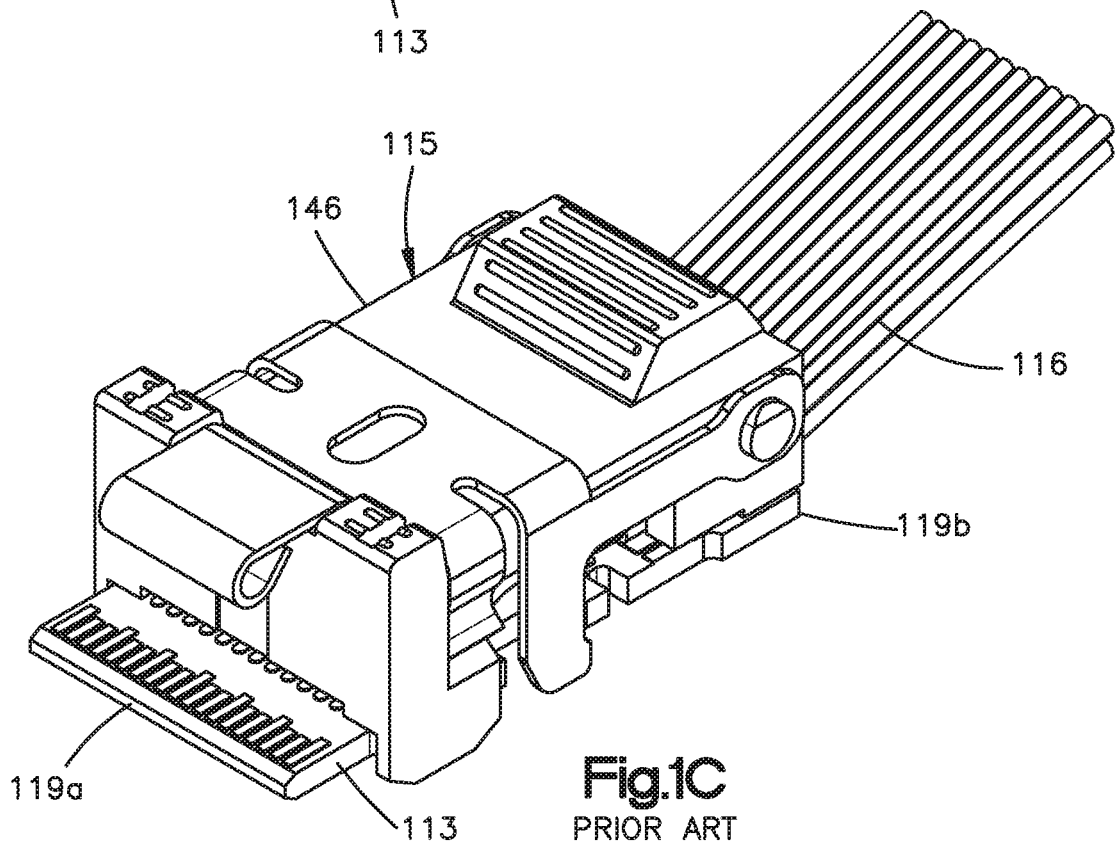
FIG. 1C is a perspective view of another example of the interconnect module of FIG. 1A.

Further, the first and second electrical connectors 210 and 212 can be mounted at any suitable location on the mid board as desired, without being constrained by the position of the panel 204 as in panel mount applications. Also, transmission distance thru the host substrate 208 may be shorter than in panel mount applications, which can improve signal strength and integrity. When mating the interconnect module 202 to the host substrate 208 at the mid board location 268, it can be desirable to reduce the area of the host substrate 208 that has to be kept clear of components to allow for maximum density of interconnect modules 202 mated to the host module 204. It can be desirable to approach the host module 204 with the interconnect module 202 in a mostly downward motion while in the case of a front panel interconnect module it is desirable to load the module in a mostly forward motion along the longitudinal direction L. It can also be desirable to have a single interconnect module 202 that can be used for either mid board or front panel mating to the host module 204 in order to reduce inventory and SKU. When mating the interconnect module 202 to the host substrate 208 at the mid board location, the interconnect module 202 can mate with the first and second electrical connectors 210 and 212 as described above with respect to the interconnect module 102 and the first and second electrical connectors 152 and 154 with reference to FIGS. 1A-1C. Advantageously, the same interconnect module 202 may be used interchangeably in either a front panel mount or mid board connection.

As illustrated in FIG. 10A, in mid board applications, the heat sink 238 can be attached to the module housing 234. The heat sink 238 can be attached to the module housing 234 before the interconnect module 202 is mated to the host module 206. Alternatively, the heat sink 238 can be attached to the module housing 234 after the interconnect module 202 is mated to the host module 206. Further, the interconnect system 200 can include at least one latch 270 that is configured to secure the interconnect module 202 to the mid board location 268 after the interconnect module 202 has been mated to the first and second electrical connectors 210 and 212 that are mounted at a mid board location 268 of the host substrate 208. It should be appreciated that the first electrical connector 210 mounted to the host substrate 208 at the mid board location 268 can be constructed the same as or differently than the first electrical connector 210 that is mated to the interconnect module 202 in the cage 214 as described above. Alternatively or additionally, the second electrical connector 212 mounted to the host substrate 208 at the mid board location 268 can be constructed the same as or differently than the second electrical connector 212 that is mated to the interconnect module 202 in the cage 214 as described above. While the respective housings of the first and second electrical connectors 210 and 212 may be different depending on the respective mounting locations of the first and second electrical connectors 210 and 212, the contact locations of the first and second electrical connectors 210 and 212 may be substantially identical in both front panel and mid board applications so that the same transceiver can mate at both locations.

The latch 270 can be mounted to the host module 206 and secured to the interconnect module 202 when the interconnect module is mated with the first and second electrical connectors 210 and 212 that are mounted to the host substrate 208 at the mid board location 268. In one example, the latch 270 can be mounted to the host substrate 208 at the mid board location 268. Alternatively, at least one latch 270 can be mounted to a respective at least one or both of the first and second electrical connectors 210 and 212. It should be appreciated that the at least one latch can be mounted to any suitable structure of the host module 206 as desired. Further, the at least one latch 270 can engage the interconnect module 202 so as to secure the interconnect module 202 to the host module 206 when the interconnect module is mated to the host module 206. It should be appreciated that the latch used to secure the interconnection module 202 in a mid board application may be different than an attachment member that secures the interconnection module 202 to the host module 206 in a front panel mount application.

Figure 10B:
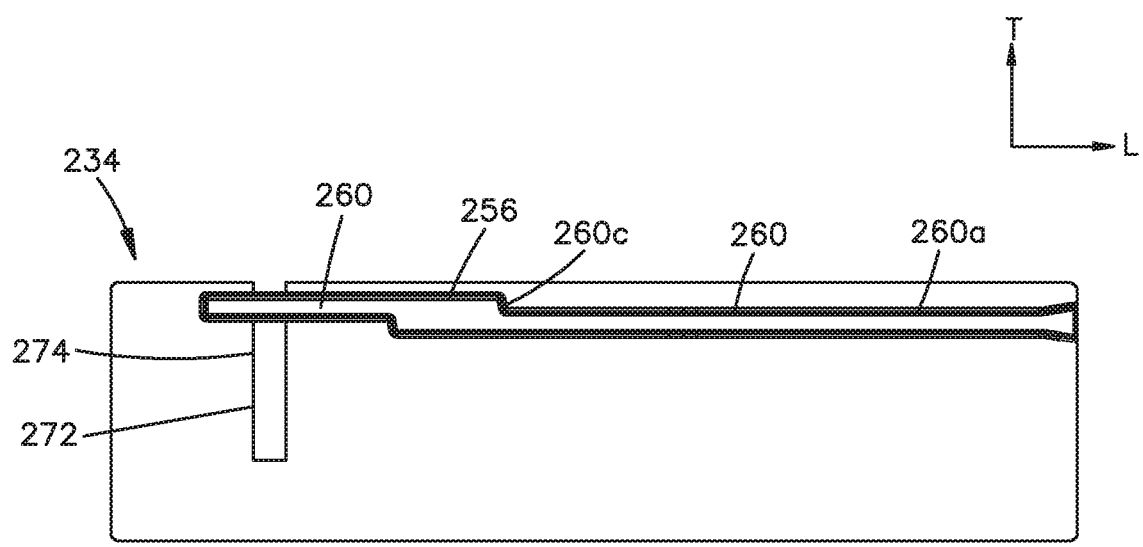
FIG. 10B is a schematic side elevation view of a module housing of the interconnect module illustrated in FIG. 10A.

Referring now to FIG. 10B, the interconnect module 202 can include a latch engagement member 272 that is configured to secure the interconnect module 202 to the latch 270 when the latch is mounted to the host module 206. The latch 270 can be configured in accordance with any suitable example described in PCT Patent Application Serial No. PCT/US17/46918 filed on Aug. 15, 2017, the disclosure of which is hereby incorporated by reference as if set forth in its entirety herein. In one example, the latch engagement member 272 can be configured as at least one latch channel 274 that is configured to receive the corresponding at least one latch 270 so as to secure the latch 270 to the interconnect module 202. The latch channel 274 can extend into the module housing 234. For instance, the latch channel 274 can extend into the module housing 234 along the lateral direction A. In one example, the latch channel 274 can extend into a corresponding at least one of the side walls of the module housing 234 in a direction toward the other one of the side walls of the module housing 234. For instance, the latch channel 274 can extend into both of the side walls of the module housing 234. The latch channel 274 can further extend into a top wall of the module housing 234. It should be appreciated, of course, that the latch engagement member 272 can be constructed in accordance with any suitable embodiment as desired.

In certain examples, the interconnect module 202 can include both the first guide member 256 and the latch engagement member 272. Thus, the interconnect module 202 can be configured to be selectively mated with the host module 206 through the panel 204 as described above, and the host module 206 wherein the host substrate 208 is configured as the mid board connection 268. In one example, at least a portion of the latch channel 274 can intersect the recess 260. For instance, the portion of the latch channel 274 can be substantially oriented in the transverse direction T. The latch channel 274 can define a width along the longitudinal direction L that is less than the length of the protrusion 262 along the longitudinal direction L. Thus, the protrusion 262 can slide past the latch channel 274 as it travels in the recess 260 along the longitudinal direction L Further still, in some examples, the host module 206 can define both the mid board connection 268 and the panel-mount interconnect module 202. Thus, the same host substrate 208 can be used to both mate with a first interconnect module 202 at the mid board location 268, and a second interconnect module 202 through a panel 204. That is, at least one first interconnect module 202 can be mated with the first and second electrical connectors 210 and 212 that are mounted to the host substrate 208 at the mid board location 268. Further, at least one second interconnect module 202 can be mated to the host substrate 202 through the panel 204 in the manner described above. Thus, the host substrate 208 can include first and second electrical connectors 210 and 212 that are configured to mate with the first at least one of the interconnect modules 202 whereby the latch 270 secures the interconnect module 202 to the host substrate 208. The host substrate 208 can further include first and second electrical connectors 210 and 212 that extend into an internal bore of a cage in the manner described above, such that the second at least one of the interconnect modules 202 is configured to mate with the first and second electrical connectors 210 and 212 in the cage in the manner described above.

Thus, a method can include the step of receiving at least one interconnect module 202, and determining whether to mate the at least one interconnect module 202 to a first host module 206 having a panel-mount host substrate through the panel 204, or to mate it to a second host module 206 at a mid board location. The at least one interconnect module 202 can be received as a singular interconnect module 202 that is configured to be selectively mated to each of the first and second host modules 206 without modification to the interconnect module 202. In particular the first guide member 256 can be configured to engage the second guide member 258 as described above. Alternatively, the latch engagement member 272 can engage the latch 270 in the manner described above.

Alternatively, the at least one interconnect module 202 can be received as first and second interconnect modules 202. If it is decided to mate the interconnect module 202 to the host module 206 through the panel 204, the first interconnect module 202 can include the first guide member 256 so as to be guided to mate with the host module 206 as it is inserted through the panel 204 in the manner described above. If it is decided to mate the at least one interconnect module 202 to the mid board connection 268, the interconnect module 202 can include the latch engagement member 272 and mated to the mid board connection 268 as described above. The method can further include the step of mating the first interconnect module 202 to the host module 206 through the panel 204 in the manner described above. The method can further include the step of mating the second interconnect module 202 to the host module 206 at the mid board location 268 in the manner described above. With the exception of the first guide member 256 and the latch engagement member 272, the first and second interconnect modules 202 can be constructed substantially (e.g., within manufacturing tolerances) identical to each other. Thus, the first and second interconnect modules 202 can consist essentially of the module housing 234, the interconnect substrate 226, and the cables 232 so as to mate with the host module 206 in the manner described above.

Alternatively, it should be appreciated that the first interconnect module 202 can include the latch engagement member 272. Similarly, the second interconnect module 202 can include the first guide member 256. Thus, the first and second ones of the interconnect modules 202 can be substantially (within manufacturing tolerance) identical to each other. Alternatively still, the at least one interconnect module 202 can be a single interconnect module 202 that can be mated to the host module 206 through the panel 204 in the manner described above, or onto the mid board location 268 in the manner described above.

It is recognized that when the interconnect module 202 is mated to the host module 206 at the mid board location 268 of the host substrate 208, in order to avoid interference with other components mounted on the host substrate 208, the interconnect module 202 often approaches the host substrate 208 along a direction of mid board approach that is has a first directional component in the downward direction, and a second directional component in the forward direction. The first directional component in the downward direction is greater than the second directional component in the forward direction. Immediately after the interconnect module 202 has approached the host module 206, the interconnect module 202 is then mated with the host module 206 along a select direction. The select direction can, for instance, include the forward direction as described above.

When the interconnect module 202 is mated to the host module 206 through the panel 204, it is recognized that the interconnect module 202 approaches the host module 206 along a direction of panel mount approach that can include the forward direction only (for instance in examples that include the biasing member 264 or when the mating regions 225 of the second electrical contacts 224 are offset with respect to the mating regions of the first electrical contacts 218). Alternatively, the direction of panel mount approach can include a first directional component in the downward direction and a second directional component in the forward direction (for instance, when the guidance system 254 includes the jog 260c). In the panel mount approach, the second directional component can be greater than the first directional component. For instance, in the panel mount approach, the interconnect module 202 may move in the forward direction at least 5 times the movement of the interconnect module 202 in the downward direction. Immediately after the interconnect module 202 has approached the host module 206 through the panel 204, the interconnect module 202 is then mated with the host module 206 along the select direction.

Either way, it is recognized that the direction of mid board approach can have a directional component in the downward direction that is greater than the directional component in the downward direction of the direction of panel mount approach. The directions of mid board approach can occur over the same select distance as the direction of panel mount approach. For instance, the select distance can be approximately 20 mm prior to driving the interconnect module 202 in the forward direction so as to mate with the host module 206. Further the direction of mid board approach and the direction of panel mount approach can terminate once the interconnect substrate 226 is aligned with the mating regions of the first electrical contacts 218 in the forward direction.

It should be noted that the illustrations and discussions of the embodiments shown in the figures are for exemplary purposes only, and should not be construed limiting the disclosure. One skilled in the art will appreciate that the present disclosure contemplates various embodiments. For example, while the invention has been generally described in terms of a transceiver, the transmitting element of the transceiver may be removed to form a receiver. Similarly, the receiving element of the transceiver may be removed to form a transmitter. The electrical compression connector described in above could be replaced by an edge connector, a ZIF (zero insertion force) connector, or any other type of low profile connector including connectors that reside or partially reside in the thickness of the host PCB, either in one or more recesses or cut outs of the host PCB. It should be understood that terms such as top, bottom, up, down, right, left, sides, vertical, and horizontal are relative terms and the embodiments described herein can be used in any orientation. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

What is claimed is:

1. An interconnect module configured to mate with a host module having a host substrate and first and second pluralities of electrical contacts supported by the host module, the interconnect module comprising:
    an interconnect substrate that defines a top and bottom surfaces opposite each other along a transverse direction, and front and rear ends opposite each other along a longitudinal direction that is oriented substantially perpendicular to the transverse direction;
    a plurality of first electrical lands carried by the bottom surface;
    a plurality of second electrical lands carried by the bottom surface disposed such that the first electrical lands are spaced from the second electrical lands in a forward direction that is oriented along the longitudinal direction; and
    a first guide member configured to engage a complementary second guide member so as to guide the interconnect module to mate with a host module in the forward direction such that 1) the first lands pass by the second electrical contacts while spaced from the second electrical contacts along the transverse direction, 2) the first lands mate with the first electrical contacts, and 3) the second lands mate with the second electrical contacts.

2. The interconnect module as recited in claim 1, comprising a transceiver having an optical engine supported by the interconnect substrate.

3. The interconnect module as recited in claim 1, wherein the first guide member comprises a recess that extends into a module housing of the interconnect module, the recess configured to receive the second guide member of the host module configured as a projection so as to guide movement of the interconnect module in the forward direction.

4. The interconnect module as recited in claim 3, wherein the recess defines a first length, and a second length offset from the first length in both a rearward direction opposite the forward direction, and an upward direction away from the interconnect substrate.

5. The interconnect module as recited in claim 1, further comprising a biasing member that is configured to urge the second electrical contacts from a first position whereby mating regions of the second electrical contacts are offset with respect to mating regions of the first electrical contacts in a downward direction toward the host substrate, to a second position that is substantially coplanar with the mating regions of the first electrical contacts after the first lands pass by the second electrical contacts.

6. An interconnect system comprising:
    the interconnect module as recited in claim 1;
    the host module as recited in claim 1; and
    a cage configured to be supported by a panel, wherein the second guide member is carried by the cage.

7. The interconnect system as recited in claim 6, wherein the first guide member is a recess defined by a module housing that extends from the interconnect substrate, and the second guide member comprises a projection that is carried by the cage and is sized to be received in the recess so as to guide motion of the interconnect module with respect to the host module.

8. An interconnect module comprising:
    an interconnect substrate defining a top surface and a bottom surface spaced from the top surface along a transverse direction;
    a module housing supported by the interconnect substrate, wherein the module housing substantially surrounds an optical engine mounted to the interconnect substrate;
    a row of a first plurality of electrical lands supported by the bottom surface of the interconnect substrate;
    a row of a second plurality of electrical lands supported by the bottom surface of the interconnect substrate at a location spaced from the row of the first plurality of electrical lands along a longitudinal direction that is substantially perpendicular to the transverse direction;
    wherein the interconnect module is configured to selectively mate to a host module through a panel and to a mid board location of the host module.

9. The interconnect module as recited in claim 8, further comprising a guide member configured to guide the interconnect module to mate with a host module through a cage, and a latch engagement member configured to receive a latch that secures the interconnect module to the host module when the interconnect module is mated to the host module at the mid board location.

10. The interconnect module as recited in claim 9, wherein the guide member comprises a recess that extends into the module housing.

11. The interconnect module as recited in claim 9, wherein the latch engagement member comprises a recess that extends into the module housing.

12. The interconnect module as recited in claim 9, wherein the latch engagement member intersects the guide member.

13. The interconnect module as recited in claim 9, wherein the guide member comprises a first length and a second length having at least a portion that is offset from the first length along both the transverse direction and the longitudinal direction.

14. The interconnect module as recited in claim 13, wherein the guide member further comprises a jog that extends from the first length to the second length.

15. The interconnect module as recited in claim 14, wherein the jog extends from a trailing end of the first length to a leading end of the second length.

16. The interconnect module as recited in claim 13, wherein the first and second lengths are oriented substantially along the longitudinal direction.

17. The interconnect module as recited in claim 14, wherein the jog is oriented substantially along the transverse direction.

18. The interconnect module as recited in claim 8, wherein the row of a first plurality of electrical lands is spaced from the row of a second plurality of electrical lands in a forward direction that is oriented along the longitudinal direction, and the interconnect module is configured to mate to the host module such that the first electrical lands are configured to mate with a first plurality of electrical contacts without wiping along a second plurality of electrical contacts of the host module that are spaced from the first plurality of electrical contacts in a rearward direction that is opposite the forward direction.

19. An interconnect module configured to mate in a forward direction with a host module having a host substrate and first and second pluralities of electrical contacts supported by the host module, the interconnect module comprising:
    an interconnect substrate that defines a top and bottom surfaces opposite each other along a transverse direction, and front and rear ends opposite each other along a longitudinal direction that is oriented substantially perpendicular to the transverse direction;

a plurality of first electrical lands carried by the bottom surface;

a plurality of second electrical lands carried by the bottom surface disposed such that the first electrical lands are spaced from the second electrical lands in the forward direction that is oriented along the longitudinal direction;

wherein the interconnect module is configured to mate with the host module mounted in either a panel mount position or mid board position.

20. The interconnect module as recited in claim 19, wherein the first lands pass over electrical contacts of the host module without wiping against the electrical contacts and the second electrical lands mate with the electrical contacts.

* * * * *